US007660481B2

(12) United States Patent
Schaap et al.

(10) Patent No.: US 7,660,481 B2
(45) Date of Patent: Feb. 9, 2010

(54) IMAGE ENHANCEMENT USING ANISOTROPIC NOISE FILTERING

(75) Inventors: Michiel Schaap, Rotterdam (NL); Karel Zuiderveld, Minnetonka, MN (US)

(73) Assignee: Vital Images, Inc., Minnetonka, MN (US)

( * ) Notice: Subject to any disclaimer, the term of this patent is extended or adjusted under 35 U.S.C. 154(b) by 559 days.

(21) Appl. No.: 11/281,257

(22) Filed: Nov. 17, 2005

(65) Prior Publication Data

US 2007/0110294 A1    May 17, 2007

(51) Int. Cl.
G06K 9/40 (2006.01)
G06K 9/00 (2006.01)

(52) U.S. Cl. .................. 382/266; 382/131; 382/261; 382/264

(58) Field of Classification Search ................ 382/131, 382/261
See application file for complete search history.

(56) References Cited

U.S. PATENT DOCUMENTS

| | | | |
|---|---|---|---|
| 4,641,351 A * | 2/1987 | Preston, Jr. ............... 382/154 |
| 4,682,291 A | 7/1987 | Reuveni |
| 5,233,670 A * | 8/1993 | Dufour et al. ............. 382/197 |
| 5,368,033 A * | 11/1994 | Moshfeghi ................. 600/419 |
| 5,461,655 A | 10/1995 | Vuylsteke et al. |
| 5,533,091 A | 7/1996 | Hsieh |
| 5,708,693 A | 1/1998 | Aach et al. |
| 5,754,618 A | 5/1998 | Okamoto et al. |
| 5,917,963 A * | 6/1999 | Miyake .................... 382/300 |
| 6,049,623 A | 4/2000 | Fuderer et al. |
| 6,173,084 B1 | 1/2001 | Aach et al. |
| 6,295,331 B1 | 9/2001 | Hsieh |
| 6,477,282 B1 * | 11/2002 | Ohtsuki et al. ............. 382/266 |
| 6,493,416 B1 | 12/2002 | Hsieh |
| 6,556,720 B1 * | 4/2003 | Avinash .................... 382/260 |
| 6,725,174 B2 * | 4/2004 | Bouts et al. ................ 702/181 |
| 6,731,821 B1 | 5/2004 | Maurer et al. |
| 6,744,532 B1 * | 6/2004 | Chen ........................ 358/1.9 |

(Continued)

FOREIGN PATENT DOCUMENTS

EP    1168244 A2    1/2002

(Continued)

OTHER PUBLICATIONS

Guido Gerig, Olaf Kubler, Ron Kikinis, and Ferenc A. Jolesz, "Nonlinear Anisotropic Filtering of MRI Data", Jun. 1992, IEEE Transactions on Medical Imaging, vol. 11, No. 2, pp. 221-232.*

(Continued)

Primary Examiner—Vikkram Bali
Assistant Examiner—Michelle Entezari
(74) Attorney, Agent, or Firm—Schwegman Lundberg & Woessner, P.A.

(57) ABSTRACT

A method including receiving data corresponding to an original three-dimensional (3D) reconstructed image, smoothing homogenous areas and enhancing edges of the original reconstructed image using edge enhancing diffusion (EED) to create edge-enhanced image data, and calculating a structural importance map. The structural importance map includes a measure of structural importance for each voxel of data in the original reconstructed image. Voxel intensities to be used to create a filtered image are determined according to at least one rule applied to the measure of structural importance.

32 Claims, 10 Drawing Sheets

U.S. PATENT DOCUMENTS

| | | | |
|---|---|---|---|
| 6,751,286 B2 | 6/2004 | Timmer | |
| 6,775,399 B1 * | 8/2004 | Jiang | 382/128 |
| 6,842,638 B1 * | 1/2005 | Suri et al. | 600/425 |
| 6,873,741 B2 | 3/2005 | Li | |
| 6,885,762 B2 | 4/2005 | Saha et al. | |
| 6,933,983 B2 * | 8/2005 | Wredenhagen et al. | 348/618 |
| 7,003,174 B2 * | 2/2006 | Kryukov et al. | 382/266 |
| 7,308,125 B2 * | 12/2007 | Atkinson | 382/131 |
| 7,352,370 B2 * | 4/2008 | Wang et al. | 345/424 |
| 7,379,561 B2 * | 5/2008 | Chauville et al. | 382/103 |
| 7,379,626 B2 * | 5/2008 | Lachine et al. | 382/300 |
| 7,551,795 B2 * | 6/2009 | Xu et al. | 382/264 |
| 2002/0126884 A1 * | 9/2002 | Gerritsen et al. | 382/131 |
| 2003/0071220 A1 * | 4/2003 | Bruder et al. | 250/369 |
| 2003/0161520 A1 * | 8/2003 | Yamano et al. | 382/128 |
| 2003/0223627 A1 * | 12/2003 | Yoshida et al. | 382/128 |
| 2005/0002546 A1 * | 1/2005 | Florent et al. | 382/128 |
| 2005/0008251 A1 * | 1/2005 | Chiang | 382/266 |
| 2005/0196041 A1 * | 9/2005 | Jerebko et al. | 382/173 |
| 2006/0035206 A1 * | 2/2006 | Clark et al. | 434/350 |
| 2006/0045346 A1 * | 3/2006 | Zhou | 382/190 |

FOREIGN PATENT DOCUMENTS

| | | |
|---|---|---|
| EP | 1168244 A3 | 12/2004 |
| WO | WO-2007061744 A2 | 5/2007 |
| WO | WO-2007061744 A3 | 5/2007 |

OTHER PUBLICATIONS

"Chapter 16 Tomographic Reconstruction in Nuclear Medicine", *In: Physics in Nuclear Medicine*, 3rd Edition, Cherry, S. R., et al., Editors, W. B. Saunders Company,(2003), 273-297.

"Eigenvalues Computation", http://accad.osu.edu/~mjiang/Projects/Eigenvalues/, 2002), 4 pgs.

"Foreword, Preface and Contents", *Spiral and Multislice Computed Tomography of the Body*, Prokup, M., et al., Editors, Thieme Publishing Group,(2002), 3 pgs.

"SOMATOM Sensation Product Information", http://www.medical.siemens.com/webapp/wcs/stores/servlet/ProductDisplay?storeId=10001&langId=-1&catalogId=-1&catTree=100001&productId=143945, (archived at archive.org on Nov. 3, 2004), 2 pgs.

Ambrose, J., "Computerized Transverse Axial Scanning (Tomography): Part 2. Clinical Application", *British Journal of Radiology*, 46(542), (1973),1023-1047.

Bagnara, R., "A Unified Proof for the Convergence of Jacobi and Gauss-Seidel Methods", *Siam Review*, 37(1), (1995),93-97.

Barrett, R., et al., *Templates for the Solution of Linear Systems: Building Blocks for Iterative Methods*, 2nd Edition, SIAM, Philadelphia, PA,(1994),141 pgs.

Baum, U., et al., "Verbesserung der Bildqualität in der MSCT des Beckens durch ein rohdaten-basiertes mehrdimensionales Filter / Improvement of the Image Quality of MSCT of the Pelvis With a Raw Data-Based, Multidimensional Filter", *Fortischr Rontgenstr*, 175(11), (2003),1572-1576.

Boll, D. T., et al., "Assessment of Automatic Vessel Tracking Techniques in Preoperative Planning of Transluminal Aortic Stent Graft Implantation", *Journal of Computer Assisted Tomography*, 28(2), (Mar./Apr. 2004), 278-285.

Catté, F., et al., "Image Selective Smoothing and Edge Detection by Nonlinear Diffusion", *SIAM Journal on Numerical Analysis*, 29(1), (1992), 182-193.

Chambolle, A., "An Algorithm for Total Variation Minimization and Applications", *Journal of Mathematical Imaging and Vision*, 20, (2004), 89-97.

Chambolle, A., et al., "Image Recovery via Total Variation Minimization and Related Problems", *Numerische Mathematik*, 76(2), (1997), 167-188.

Chen, Z., et al., "Breast Volume Denoising and Noise Characterization by 3D Wavelet Transform", *Computerized Medical Imaging and Graphics*, 28, (2004),235-246.

Chew, E., et al., "Effect of CT Noise on Detectability of Test Objects", *American Journal of Roentgenology*, 131(4), (1978), 681-685.

Depoutre, A., "The Thomas Algorithm", http://wn7.enseeiht.fr/hmf/travaux/CD0001/travaux/optimfn/hi/01pa/hyb74/node24.html, (2000), 3 pgs.

Dobson, D. C., et al., "Recovery of Blocky Images from Noisy and Blurred Data", *SIAM Journal on Applied Mathematics*, 56(4), (1996),1181-1198.

Escalante-Ramírez, B., et al., "Multidimensional Characterization of the Perceptual Quality of Noise-Reduced Computed Tomography Images", *Journal of Visual Communication and Image Representation*, 6(4), (1995), 317-334.

Frangakis, A. S., et al., "Noise Reduction in Electron Tomographic Reconstructions Using Nonlinear Anisotropic Diffusion", *Journal of Structural Biology*, 135(3), (2001), 239-250.

Frangakis, A. S., et al., "Wavelet Transform Filtering and Nonlinear Anisotropic Diffusion Assessed for Signal Reconstruction Performance on Multidimensional Biomedical Data", *IEEE Transactions on Biomedical Engineering*, 48(2), (2001), 213-222.

Frangi, A. F., et al., "Multiscale Vessel Enhancement Filtering", *Medical Image Computing and Computer-Assisted Intervention—MICCAI '98; Lecture Notes in Computer Science*, vol. 1496, (1998),130-137.

Haaga, J. R., et al., "The Effect of mAs Variation Upon Computed Tomography Image Quality as Evaluated by In Vivo and In Vitro Studies", *Radiology*, 138, (1981), 449-454.

Hanson, K. M., "Chapter 113—Noise and Contrast Discrimination in Computed Tomography", *In: Radiology of the Skull and Brain*, vol. 5: *Technical Aspects of Computed Tomography*, Newton, T. H., et al., Editors, The C. V. Mosby Companies, St. Louis, MO, (1981), 3941-3955.

Hanson, K. M., "Detectability in Computed Tomographic Images", *Medical Physics*, 6(5), (1979), 441-451.

Hilts, M., et al., "Image Filtering for Improved Dose Resolution in CT Polymer Gel Dosimetry", *Medical Physics*, 31(1), (2004), 39-49.

Hilts, M., et al., "Image Noise in X-Ray CT Polymer Gel Dosimetry", *Journal of Physics: Conference Series 3*, (2004), 252-256.

Judy, P. F., et al., "Lesion Detection and Signal-to-Noise Ratio in CT Images", *Medical Physics*, 8(1), (1981), 13-23.

Kalra, M. K., et al., "Can Noise Reduction Filters Improve Low-Radiation-Dose Chest CT Images? Pilot Study", *Radiology*, 228(1), (2003),251-256.

Kalra, M. K., et al., "Low-Dose CT of the Abdomen: Evaluation of Image Improvement With Use of Noise Reduction Filters—Pilot Study", *Radiology*, 228(1), (2003), 251-256.

Keselbrener, L., et al., "Nonlinear Filters Applied On Computerized Axial Tomography: Theory and Phantom Images", *Medical Physics*, 19(4), (Jul./Aug. 1992), 1057-1064.

Ko, J. P., et al., "Wavelet Compression of Low-Dose Chest CT Data: Effect on Lung Nodule Detection", *Radiology*, 228(1), (2003), 70-75.

Koenderink, J. J., "The Structure of Images", *Biological Cybernetics*, 50(5), (1984), 363-370.

Lederle, F. A., et al., "Prevalence and Associations of Abdominal Aortic Aneurysm Detected Through Screening", *Annuals of Internal Medicine*, 126(6), (1997), 441-449.

Lee, J.-S., "Digital Image Smoothing and the Sigma Filter", *Computer Vision, Graphics, and Image Processing*, 24, (1983), 255-269.

Lindeberg, T., "Edge Detection and Ridge Detection With Automatic Scale Selection", *International Journal of Computer Vision*, 30(2), (1998), 117-154.

Manniesing, R., et al., "Multiscale Vessel Enhancing Diffusion in CT Angiography Noise Filtering", *Proceedings of Information Processing in Medical Imaging*, vol. 3565, (2005), 138-149.

Meijering, E., et al., "Evaluation of Diffusion Techniques for Improved Vessel Visualization and Quantification in Three-Dimensional Rotational Angiography", *Proceedings of Medical Image Computing and Computer-Assisted Intervention (MICCAI 2001); Lecture Notes in Computer Science*, vol. 2208, (2001), 177-185.

Mrázek, P., et al., "Consistent Positive Directional Splitting of Anisotropic Diffusion", *In: Proceedings of Computer Vision Winter Workshop*, Likar, B., Editor, Slovenian Pattern Recognition Society,(Feb. 2001), 37-48.

Mullins, M. E., et al., "Comparison of Image Quality Between Conventional and Low-Dose Nonenhanced Head CT", *AJNR American Journal of Neuroradiology*, 25(4), (2004),533-538.

Ohnesorge, B., et al., "Cardiac Imaging by Means of Electrocardiographically Gated Multisection Spiral CT: Initial Experience", *Radiology*, 217(2), (2000), 564-571.

Okada, M., "Noise Evaluation and Filter Design in CT Images", *IEEE Transactions on Biomedical Engineering*, vol. BME-32, No. 9, 713-719.

Perona, P., et al., "Scale-Space and Edge Detection Using Anisotropic Diffusion", *IEEE Transactions on Pattern Analysis and Machine Intelligence*, 12(7), (1990), 629-639.

Romeny, B. M., "Chapter 16. Deblurring Gaussian Blur", *Front-End Vision and Multi-Scale Image Analysis—Multi-Scale Computer Vision Theory and Applications, written in Mathematica*, Kluwer Academic Publishers, Dordrecht, The Netherlands, (2003), 8 pgs.

Romeny, B. M., "Chapter 21. Geometry-Driven Diffusion", *Front-End Vision and Multi-Scale Image Analysis—Multi-Scale Computer Vision Theory and Applications, written in Mathematica*, Kluwer Aademic Publishers, Dordrecht, The Netherlands,(2003), 33 pgs.

Romeny, B. M., "Chapter 3. The Caussian Kernel", *Front-End Vision and Multi-Scale Image Analysis—Multi-Scale Computer Vision Theory and Applications, written in Mathematica*, Kluwer Academic Publishers, Dordrecht, The Netherlands,(2003), 15 pgs.

Romeny, B. M., "Chapter 4. Gaussian Derivatives", *Front-Endd Vision and Multi-Scale Image Analysis—Multi-Scale Computer Vision Theory and Applications, written in Mathematica*, Kluwer Academic Publishers, Dordrecht, The Netherlands,(2003), 17 pgs.

Romeny, B. M., "Chapter 6. Differential Structure of Images", *Front-End Vision and Multi-Scale Image Analysis—Multi-Scale Computer Vision Theory and Applications, written in Mathematica*, Kluwer Academic Publishers, Dordrecht, The Netherlands,(2003), 46 pgs.

Romeny, B. M., "Table of Contents", *Front-End Vision and Multi-Scale Image Analysis—Multi-Scale Computer Vision Theory and Applications, written in Mathematica*, Kluwer Academic Publishers, Dordrecht, The Netherlands,(2003), 14 pgs.

Rubin, G. D., et al., "Cost Identification of Abdominal Aortic Aneurysm Imaging by Using Time and Motion Analyses", *Radiology*, 215((1), (2000),63-70.

Rutherford, R. A., et al., "Measurement of Effective Atomic Number and Electron Density Using an EMI Sensor", *American Journal of Neuroradiology*, 11, (1976), 15-21.

Schaap, M., "Structure Controlled Edge Enhancing Diffusion for Noise Reduction in Computer Tomography using a Fast Semi-Implicit Implementation", Master's Thesis, Image Sciences Institute of the University of Utrecht, The Netherlands and Vital Images, Inc., Minnetonka, Minnesota,(2005), 103 pgs.

Schertler, T., et al., "Effects of ECG Gating and Postprocessing Techniques on 3D MDCT of the Bronchial Tree", *American Journal Roentgenology*, 183(1), (2004), 83-89.

Tam, R. C., et al., "Volume Rendering of Abdominal Aortic Aneurysms", *Proceedings of the 8th IEEE Visualization '97 Conference*, (1997), 43-50.

Van Gelder, R. E., et al., "CT Colonography: Feasibility of Substantial Dose Reduction—Comparison of Medium to Very Low Doses in Identical Patients", *Radiology*, 232(2), (2004), 611-620.

Voci, F., et al., "Estimating the Gradient Threshold in the Perona-Malik Equation", *IEEE Signal Processing Magazine*, 1053(5888), (2004),39-46.

Weickert, J., "A Review of Nonlinear Diffusion Filtering", *Scale-Space Theory in Computer Vision, Lecture Notes in Computer Science*, vol. 1252, (1997), 3-28.

Weickert, J., "Anisotropic Diffusion in Image Processing", Ph.D. Thesis, Department of Mathematics, University of Kaiserslautern, Germany,(1996), 147 pgs.

Weickert, J., "Applications of Nonlinear Diffusion in Image Processing and Computer Vision", *Acta Math. Univ. Comenianae*, vol. LXX, (2001), 33-50.

Weickert, J., et al., "Efficient and Reliable Schemes for Nonlinear Diffusion Filtering", *IEEE Transactions on Image Processing*, 7(3), (1998), 398-410.

Weickert, J., et al., "Parallel Implementations of AOS Schemes: A Fast Way of Nonlinear Diffusion Filtering", *Proceedings of IEEE International Conference on Image Processing (ICIP-97)*, (1997), 396-399.

Weisstein, E. W., "Cramer's Rule", *MathWorld—A Wolfram Web Resource*, http://mathworld.wolfram.com/CramersRule.html,(1999),3 pgs.

Weisstein, E. W., "Euler-Lagrange Differential Equation", *MathWorld—A Wolfram Web Resource*, http://mathworld.wolfram.com/Euler-LagrangeDifferentialEquation.html,(1999), 4 pgs.

Weisstein, E. W., et al., "Fisher Sign Test", *MathWorld—A Wolfram Web Resource*, http://mathworld.wolfram.com/FisherSignTest.html,(1999), 1 pg.

Weisstein, E. W., et al., "Gauss-Seidel Method", *MathWorld—A Wolfram Web Resource*, http://mathworld.wolfram.com/Gauss-SeidelMethod.html,(1999),2 pgs.

Weisstein, E. W., et al., "Jacobi Method", *MathWorld—A Wolfram Web Resource*, http://mathworld.wolfram.com/JacobiMethod.html,(1999),2 pgs.

Weisstein, E. W., "Method of Steepest Descent", *MathWorld—A Wolfram Web Resource*, (1999), 2 pgs.

Yang, G.-Z., et al., "CT Image Enhancement With Wavelet Analysis for the Detection of Small Airways Disease", *IEEE Transactions on Medical Imaging*, 16(6), (1997), 953-961.

Zhong, J., et al., "Image Denoising Based on Multiscale Singularity Detection for Cone Beam CT Breast Imaging", *IEEE Transactions on Medical Imaging*, 23(6), (2004), 696-703.

"International Application Serial No. PCT/US2006/044487, International Search Report mailed Jan. 21, 2008", 8 pgs.

"International Application Serial No. PCT/US2006/044487, Partial Search Report mailed Sep. 20, 2007", 10 pgs.

"International Application Serial No. PCT/US2006/044487, Written Opinion mailed Jan. 21, 2008", 16 pgs.

Bogdan, S., et al., "Chapter 12: Nonlinear Techniques for Color Image Processing", *Nonlinear Signal And Image Processing: Theory, Methods, And Applications*, (2004).

Ighey, H., et al., "Image Replacement Through Texture Synthesis", *Proceedings of the International Conference On Image Processing*,vol. 3, (Oct. 26, 1997),186-189.

Lee, S., et al., "Noise Removal with Gauss Curavature-Driven Diffusion", *IEEE Transactions on Image Processing*, vol. 14(7), (Jul. 2005),904-909.

Llebaria, A., et al., "Discrimination of point-like Objects in astronomical images using surface curvature", *Astronomical Society of the Pacific*, 77, (1995),484-487.

Smolka, B., et al., "Nonlinear Techniques for Color Image Processing", *Nonlinear Signal and Image Processing: Theory, Methods, and Application*, (2004),445-505.

* cited by examiner (a) Varying α

(b) Varying β

```
A 2D example of a separated 3x3 dilation:

Input mask:
- - - - -
- x - - -
- - - - -
- x x x -
- - - - -
```

FIG. 7A

```
dilation in x-direction:
- - - - -
x x x - -
- - - - -
x x x x x
- - - - -
```

FIG. 7B

```
dilation in y-direction:
x x x - -
x x x - -
x x x x x
x x x x x
x x x x x
```

FIG. 7C

IMAGE ENHANCEMENT USING ANISOTROPIC NOISE FILTERING

TECHNICAL FIELD

The field generally relates to image processing and, in particular but not by way of limitation, to systems and methods to enhance reconstructed three dimensional (3D) diagnostic images.

BACKGROUND

Computer X-ray tomography (CT) is a 3D viewing technique for the diagnosis of internal diseases. FIG. 1 shows an example of a prior art CT system 100. The system includes an X-ray source 105 and an array of X-ray detectors 110. In CT, the X-Ray source is rotated around a subject 115 by a CT scanner. The X-ray source 105 projects radiation through the subject 115 onto the detectors 110 to collect projection data. The subject 115 may be placed on a movable platform 120 that is manipulated by a motor 125 and computing equipment 130. This allows the different images to be taken at different locations. The collected projection data is then transferred to the computing equipment 130. A 3D image is then reconstructed mathematically from the rotational X-ray projection data using tomographic reconstruction. The 3D image can then be viewed on the video display 135.

Magnetic Resonance Imaging (MRI) is a diagnostic 3D viewing technique where the subject is placed in a powerful uniform magnetic field. In order to image different sections of the subject, three orthogonal magnetic gradients are applied in this uniform magnetic field. Radio frequency (RF) pulses are applied to a specific section to cause hydrogen atoms in the section to absorb the RF energy and begin resonating. The location of these sections is determined by the strength of the different gradients and the frequency of the RF pulse. After the RF pulse has been delivered, the hydrogen atoms stop resonating, release the absorbed energy, and become realigned to the uniform magnetic field. The released energy can be detected as an RF pulse. Because the detected RF pulse signal depends on specific properties of tissue in a section, MRI is able to measure and reconstruct a 3D image of the subject. This 3D image or volume consists of volume elements, or voxels.

Imaging in MRI and CT is complicated by image noise in the resulting reconstructed images. There are several sources of noise in MRI. Examples of noise sources include electronic thermal noise in the MRI detectors and noise caused by Brownian motion of ions in bodily fluids of the patient. In CT, noise, resolution, and radiation dose are closely related. Noise is primarily determined by the total amount of information (i.e. radiation) that reaches the detectors after being attenuated by the patient. The uncertainty per voxel (the noise) will be higher if the resolution is increased while keeping the radiation dose constant. Likewise, the uncertainty per voxel will also increase if the radiation dose is lowered or if there is a higher attenuation of the X-ray beams. While increasing radiation dose improves image quality, lowering the dose decreases the risk of possible harmful side effects in patients from ionizing radiation. The diagnostic capabilities of CT can be increased by decreasing noise on and around important internal structures while preserving the spatial resolution of the structures. Maintaining the spatial resolution during noise filtering results making smaller details easier to distinguish, thereby improving diagnosis.

All methods of spatial filtering of 3D images typically involve some type of trade off between computational speed and image quality. Currently, filtering methods that give the best results in image quality are those that use algorithms that are computationally complex and are not regarded as useful in clinical applications.

SUMMARY

This document discusses, among other things, systems and methods for improving diagnostic capability in 3D reconstructed images by reducing noise. A system example includes a database memory and a processor in communication with the database memory. The database memory stores original reconstructed image data corresponding to an original 3D image. The processor includes an image filtering module that smoothes noisy homogenous areas and enhances edges of the original reconstructed image using edge enhancing diffusion (EED) to create edge-enhanced image data. The image filtering module also calculates a structural importance map that includes a measure of structural importance for each voxel of data in the original reconstructed image, and determines a voxel intensity to be used to create a filtered image according to at least one rule applied to the measure of structural importance.

A method example includes receiving data corresponding to an original three-dimensional (3D) reconstructed image, smoothing homogenous areas and enhancing edges of the original reconstructed image using edge enhancing diffusion (EED) to create edge-enhanced image data, and calculating a structural importance map. The structural importance map includes a measure of structural importance for each voxel of data in the original reconstructed image. Voxel intensities to be used to create a filtered image are determined according to at least one rule applied to the measures of structural importance.

This summary is intended to provide an overview of the subject matter of the present patent application. It is not intended to provide an exclusive or exhaustive explanation of the invention. The detailed description is included to provide further information about the subject matter of the present patent application.

BRIEF DESCRIPTION OF THE DRAWINGS

FIGS. 7A-C illustrates a two dimensional (2D) example of two separate dilations with a three point kernel.

DETAILED DESCRIPTION

In the following detailed description, reference is made to the accompanying drawings which form a part hereof, and specific examples in which the invention may be practiced are shown by way of illustration. It is to be understood that other embodiments may be used and structural or logical changes may be made without departing from the scope of the present invention.

The functions or algorithms described herein are implemented in software or a combination of software and human implemented procedures in one example. The software comprises computer executable instructions stored on computer readable media such as memory or other type of storage devices. Further, such functions correspond to modules, which are software, hardware, firmware or any combination thereof. Multiple functions are performed in one or more modules as desired, and the embodiments described are merely examples. The software is executed on a processor operating on a computer system, such as a personal computer, server or other computer system.

This document discusses systems and methods for enhancing 3D reconstructed images. The systems and methods are described in terms of solving problems inherent with computer X-ray tomography (CT) images, but the filtering methods and systems described herein also can be used to reduce noise in 3D images created by other means, such as MRI and 3D ultrasound.

The desired results of CT image enhancement are first to decrease the total amount of noise on and around big structures like the aorta, big vessels, and heart muscles, and second to decrease the total amount of noise on and around small structures like vessels and calcifications, while preserving the resolution of the small structures. Based on these desired results, it is useful to distinguish between three image structure dimension scales: a small scale for noise, an intermediate scale for structures such as vessels, calcifications, or bronchi, and a large scale for anatomical structures like the aorta, the large blood vessels, and heart muscles. Spatial filtering is used to reduce noise in 3D images. Using the dimension scales, three goals of noise reduction in CT images can be formulated. The first is to smooth noisy homogenous areas by removing the smallest structures from the image in these areas (the term "noisy homogenous areas" refers to regions in the image that would be homogenous if the image series was not disturbed by noise). The second is to preserve the important intermediate scale structures, and third is to enhance the edges between the large scale structures.

Methods of spatial filtering of images often rely on diffusion of image intensities. This approach to image intensity diffusion is analogous to physical heat diffusion. Voxel image intensities are transported based on the structure and density of the image, much like heat is conducted in materials with inhomogeneous density.

Figure 1:
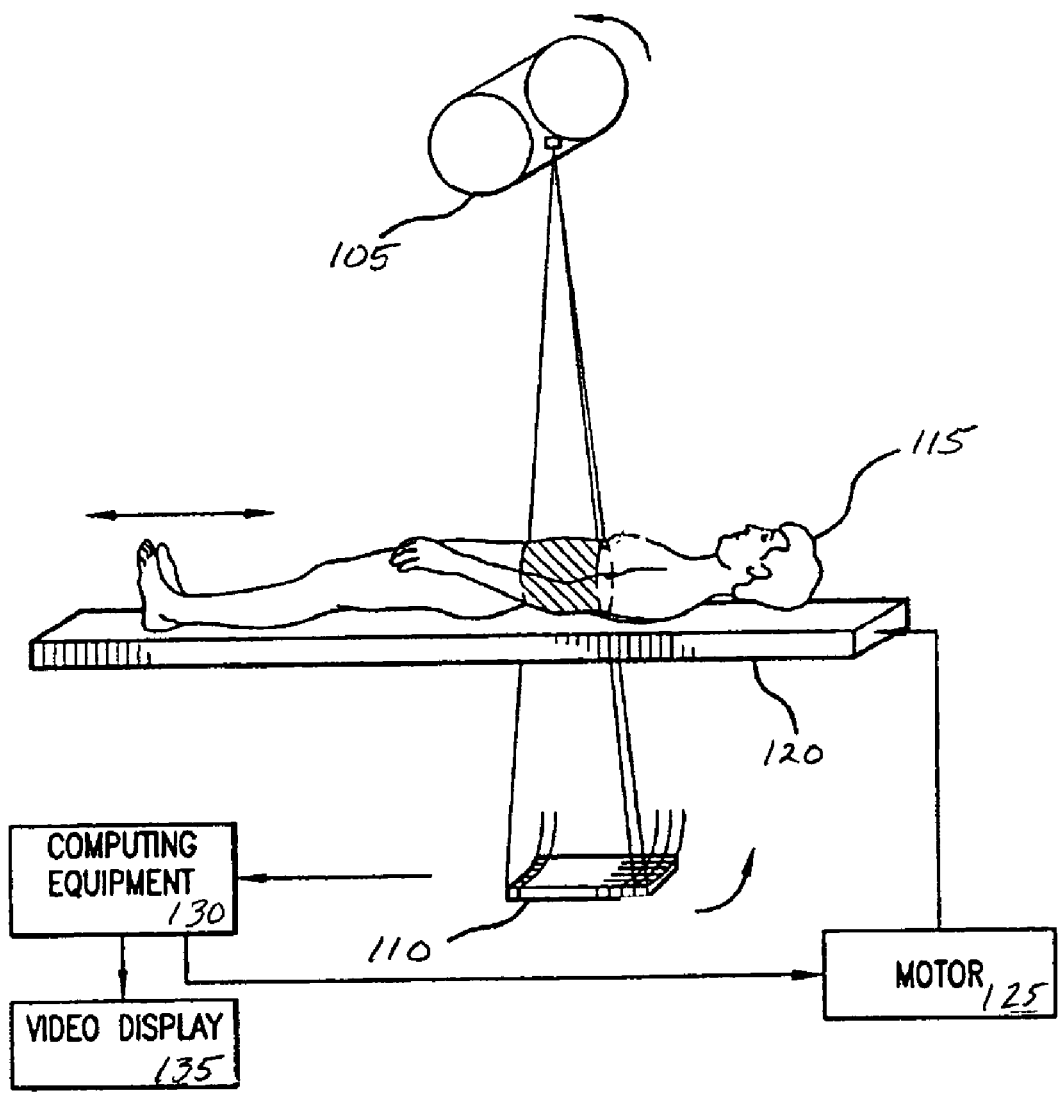
FIG. 1 is an illustration of an example of a CT system.
Figure 2A:
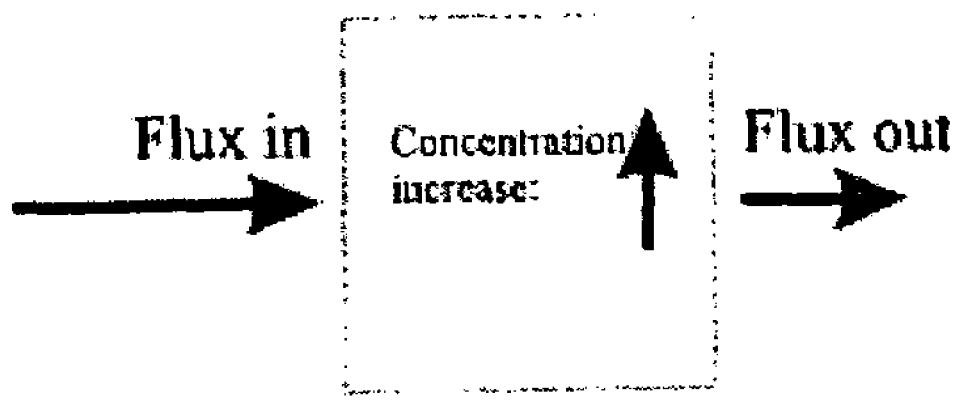
FIG. 2A shows a one-dimensional example of divergence of flux.

Flux is defined for 3D images as a three-dimensional vector representing the movement of image intensity concentration at each point. The diffusion equation states that when diffusion is present in an image, the divergence of flux equals the change in intensity at each point of the image. FIG. 2A shows a simple one-dimensional example of divergence of flux. The divergence of the flux is defined as the sum of the partial derivatives of the flux with respect to each axis in three-dimensional space. This allows the change in each point of the image to be written as $$\frac{\partial u}{\partial t} = \Delta \cdot F(u), \quad (1)$$

where F(u) is the flux and t is a scale parameter related to the intrinsic spatial resolution of image u at scale t. The parameter t is user-defined and defines the amount of diffusion in the image. The diffusion equation also states that the flux at each point is equal to the gradient of the concentration, or $$F(u) = \nabla u. \quad (2)$$

The gradient of the image intensity of a voxel is a vector having a magnitude that is the maximum rate of change of the image intensity at the voxel and having a direction pointing toward that maximum rate of change. Combining equations (1) and (2) yields $$\frac{\partial u}{\partial t} = \nabla \cdot \nabla u = \Delta u. \quad (3)$$

Figure 2B:
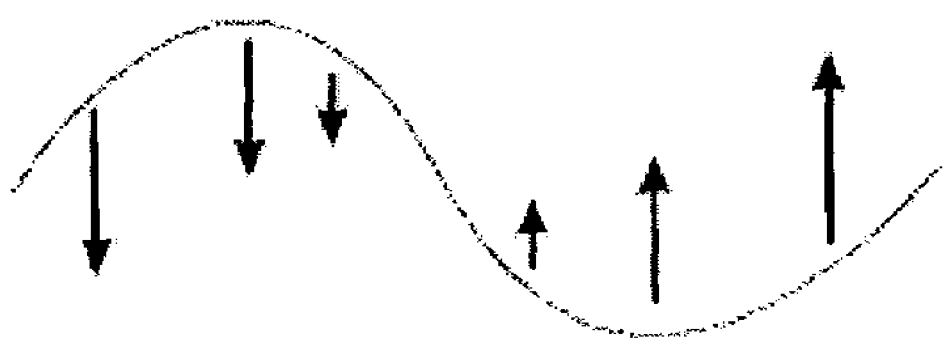
FIG. 2B shows an example of blurring an intensity signal.

Equation (3) states that the intensity change per point is equal to the sum of the second order partial derivatives, which is also called the Laplacian ($\Delta u$). The second order derivative of a signal corresponds to the curvature of the intensity signal, and the sign determines whether the function is locally convex (in a minimum) or concave (in a maximum). The second order derivative is positive in minima and negative in maxima. Therefore, minima will increase and maxima will decrease with the diffusion equation. This effect is often called blurring and is shown in FIG. 2B. A slightly modified version of equation (3) is $$\frac{\partial u}{\partial t} = g(u)\Delta u. \quad (4)$$

In this equation, g(u) determines the amount of diffusion and is called the diffusivity. The amount of diffusion in an image can be changed by changing g(u) over the image.

Regulating the diffusivity in accordance with the intensity signal itself has advantages over uniform diffusion in that it allows the diffusion to be defined by a priori information about the image, noise, or noise reduction goal. One diffusion method that changes the diffusion according to the local image geometry is anisotropic diffusion. Anisotropic diffusion not only scales the flux as in equation (4), it allows the diffusion to be different along different directions defined by the local geometry of the image. Thus, diffusion across an edge of a structure can be prevented while allowing diffusion along the edge. This prevents the edge from being smoothed while the noise is filtered. A typical implementation of anisotropic diffusion constructs diffusion tensors based on calculated spatial information that includes calculated gradients. The input image is then diffused using the diffusion tensors.

Diffusion tensors for the input image voxels are constructed to define a transformation of the concentration gradient in equation (2) to a new flux, i.e, $$F(u) = D \cdot \nabla u, \quad (5)$$

where D is the diffusion tensor corresponding to the voxel with gradient u. The diffusion tensor D can be used to describe every kind of transformation of the flux, such as a rotation of the flux. The anisotropic diffusion equation is defined as $$\frac{\partial u}{\partial t} = \nabla \cdot (D \nabla u). \quad (6)$$

The diffusion tensor is a 3×3 matrix that can be written as $$D = \begin{pmatrix} a & b & c \\ b & d & e \\ c & e & f \end{pmatrix}. \quad (7)$$

Anisotropic diffusion allows changing the direction of the flux of the intensity in the image while preserving its magnitude. Constructing a diffusion tensor corresponding to each voxel involves calculating the eigenvectors and eigenvalues of the diffusion tensors. The eigenvectors and eigenvalues are constructed according to the local image geometry. In some examples, this local image geometry includes the intensity gradient.

The next step in anisotropic diffusion, diffusing the image, involves solving the diffusion equation. A form of the anisotropic diffusion equation (6), in which the diffusion tensors are based on the local geometry, is $$\frac{\partial u}{\partial t} = \nabla \cdot (D(u) \nabla u), \quad (8)$$

where the diffusion tensor D is a function of local image structure. This equation is a continuous equation for a continuous scale space with scale parameter t. To apply equation (8) to images that are made up of discrete image units (voxels), the equation is expressed in discrete form as a matrix multiplication, $$U_{k+1} = U_k + \Delta t A(U_k) U_k, \quad (9)$$

where U is the discrete version of u ordered as a vector, and $A(U_k)$ is a large matrix that is based on the image U. $A(U_k)U_k$ is an approximation of the continuous term $\nabla \cdot (D \nabla U_k)$, i.e., $$A(U_k)U_k \approx \nabla \cdot (D \nabla U_k), \quad (10)$$

To calculate a discrete (i.e. filtered) image at a specific position t in the continuous space, the continuous scale-space is discretized in steps of $\Delta t$ with discrete scale parameter k, where $t=k\Delta t$. $U_o$ is the image before noise filtering. For calculation of an image at a specific scale-space t, in the anisotropic scale-space it is necessary to choose $\Delta t$ and perform $t/\Delta t$ iterations. The step size $\Delta t$ determines the accuracy of the discrete approximation. The smaller the $\Delta t$, the more accurate the solution and thus, the more the solution resembles the continuous equation. An inaccurate discrete approximation can, for example, result in blurring of edges and small structures in the image that is not described by the continuous equation.

Because of numerical stability and reasonable accuracy, 0.15 is often used as the scale-space step. Equation (9) represents one iteration of the solution. In each iteration, $U_{k+1}$ is calculated according to $U_k$. Solving equation (9) by multiplication of the matrix A with the ordered image $U_k$ is very expensive in computation time. For this reason, the third step of anisotropic diffusion, diffusing the image, typically includes solving equation (9) as a kernel filter operation.

Three dimensional (3D) diffusion can be implemented by convolution of the 3D image with a voxel-specific 3D diffusion kernel. The image data is processed voxel-by-voxel. For each voxel, the diffusion kernel is conceptually "centered" on the voxel. A new voxel value is calculated by multiplying the values of the diffusion kernel by the current center voxel value and the values of the center voxel's surrounding neighbors and adding the products together. The surrounding neighborhood is defined by the size of the kernel. The different values of the kernel depend on the values of the diffusion tensors. This means that the values of the kernel have to be determined for each calculation of a new voxel value.

One form of anisotropic diffusion is edge enhancing diffusion (EED). This method blurs the noise around the edges of a structure, but preserves the noise in the edges because blurring occurs in a direction perpendicular to the edges. Partly because of this, EED helps satisfy the first goal of spatial filtering of removing the smallest structures from the image in homogenous areas and the third goal of enhancing the edges between the large scale structures.

EED can be divided into two parts. The first part is the construction of diffusion tensors. The second part is the actual diffusion of the image. Constructing the diffusion tensors in EED typically involves several steps. First, a concentration gradient of the image intensity is calculated for all voxels of an image. The norms of the gradients are then calculated. Then, for each voxel, a corresponding diffusion tensor is constructed by deriving its eigenvectors and eigenvalues.

The eigenvectors of the diffusion tensor are constructed according to the intensity gradient. The first eigenvector is parallel to the gradient and, because the eigenvectors are mutually orthogonal, the other eigenvectors are perpendicular to the gradient. The eigenvalues $\lambda$ of the diffusion tensor are constructed from the gradient magnitude. The second and third eigenvalues $\lambda_2$ and $\lambda_3$ will always be equal to 1, and the first eigenvalue $\lambda_1$ will have a value between 0 and 1 as a decreasing function of the first eigenvector $\mu_1$ of the diffusion tensor or, $$\lambda_1 = g(\mu_1). \quad (11)$$

The first eigenvalue $\lambda_1$ can be expressed as a function of the magnitude of the concentration gradient $\nabla u$ and is calculated by $$\lambda_1 = g(\|\nabla u_\sigma\|) = 1, \text{ if } \|\nabla u_\sigma\| \leq 0, \text{ and} \quad (12)$$

$$\lambda_1 = g(\|\nabla u_\sigma\|) = 1 - \exp\left(\frac{-C_m}{(\|\nabla u_\sigma\|/\lambda)^m}\right), \text{ if } \|\nabla u_\sigma\| > 0. \quad (13)$$

where $\|\nabla u_\sigma\|$ is the gradient norm calculated on a specific scale $\sigma$. The parameters m and $C_m$ are chosen empirically to be m=4 and $C_4$=3.31488, respectively. In Equation 13, the parameter $\lambda$ regulates the amount of anisotropic blurring.

Figure 3:
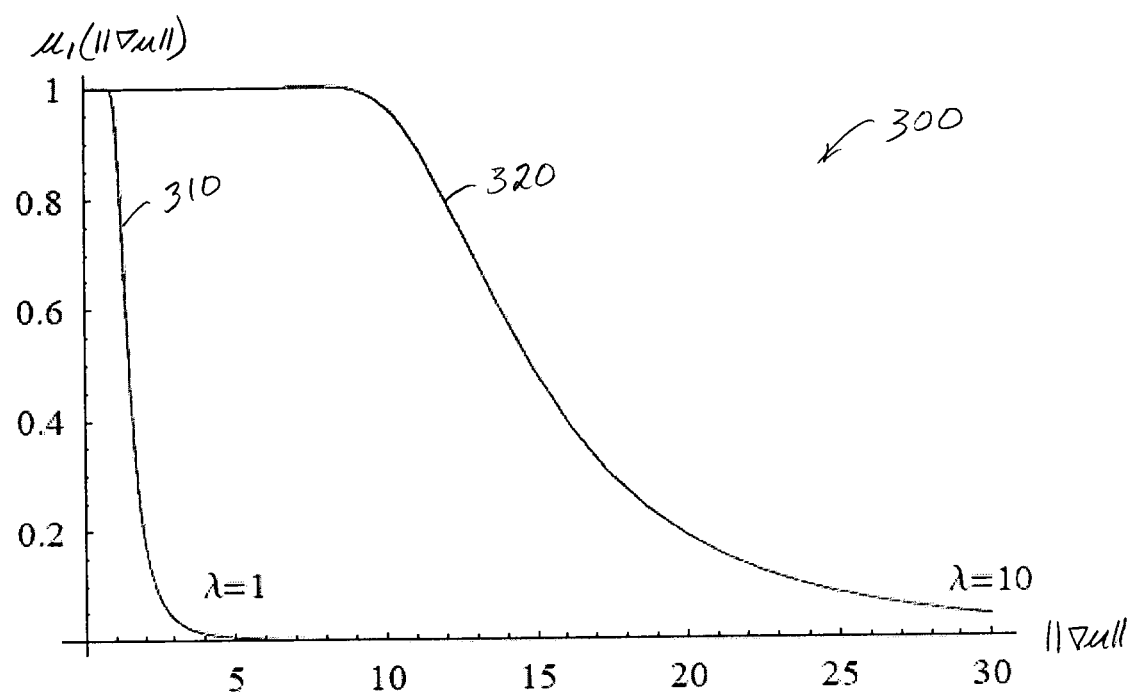
FIG. 3 shows graphs eigenvalues as a function of a gradient norm.

FIG. 3 shows examples of graphs 300 of the first eigenvalue $\lambda_1$ as a function of the gradient norm $\|\nabla u_\sigma\|$. The first eigenvalue $\lambda_1$ is shown in FIG. 3 to be a decreasing function of $\|\nabla u_\sigma\|$ and has a value between 0 and 1. The second and third eigenvalues of the diffusion tensor, $\lambda_2$, and $\lambda_3$, are set equal to 1. Because $\lambda_1$ decreases with the value of the gradient norm (and thus, with the strength of the gradient), and because the remaining eigenvalues are equal to one, isotropic blurring will occur in areas without edges (a weak gradient) and blurring perpendicular to edges will occur in areas with edges (a strong gradient). Two graphs are shown in FIG. 3; one graph 310 for a value of the blurring parameter λ=1, and one graph 320 for a value of λ=10. It can be seen from the graphs 300 that higher values of λ need a higher gradient norm, and therefore higher contrast, to have strong anisotropic blurring.

Once a diffusion tensor is constructed to correspond to each voxel, the image is diffused. As discussed previously, because matrix multiplication to solve the discretized diffusion equation is computationally expensive, the second step of EED can include constructing a diffusion kernel from the diffusion tensors to implement the multiplication in Equation (10).

To construct the diffusion kernel, the multiplication of matrix A with vector $U_k$ in equation (10) is viewed as a discretization of $\nabla \cdot (D(U_k)\nabla U_k)$. This allows equation (10) to be rewritten as $$U_{k+1} \approx U_k + \Delta t(\nabla \cdot (D\nabla U_k)), \quad (14)$$

where U is the image data represented as a matrix, k is the discrete position in scale-space, D is the diffusion tensor, and Δt is the scale-step in the discrete scale-space. The operator $$\nabla \cdot (D\nabla U_k) \quad (15)$$

is discretized. This discretized operator will be used to construct a matrix A that will be used to perform the matrix multiplication. In three dimensions, the operator is equal to $$\partial_x(a\partial_x U) + \partial_x(b\partial_y U) + \partial_x(c\partial_x U) + \partial_y(b\partial_x U) + \quad (16)$$
$$\partial_y(d\partial_y U) + \partial_y(e\partial_z U) + \partial_z(c\partial_x U) + \partial_z(e\partial_y U) + \partial_z(f\partial_z U),$$

where a, b, c, d, e, and f refer to the six elements of the diffusion vector from equation (7). A 3×3×3 diffusion kernel requires the calculation of 27 kernel elements. Discretization of the differentiation terms for such a 3×3×3 kernel results in the following 19 nonzero coefficients:

$$A_{i,j(-1,0,0)} = \frac{a_{(-1,0,0)} + a_{(0,0,0)}}{2} \quad (17)$$

$$A_{i,j(+1,0,0)} = \frac{a_{(+1,0,0)} + a_{(0,0,0)}}{2}$$

$$A_{i,j(0,-1,0)} = \frac{d_{(0,-1,0)} - d_{(0,0,0)}}{2}$$

$$A_{i,j(0,+1,0)} = \frac{d_{(0,+1,0)} - d_{(0,0,0)}}{2}$$

$$A_{i,j(0,0,-1)} = \frac{f_{(0,0,-1)} - f_{(0,0,0)}}{2}$$

$$A_{i,j(0,0,+1)} = \frac{f_{(0,0,+1)} - f_{(0,0,0)}}{2}$$

$$A_{i,j} = -\begin{pmatrix} A_{i,j(-1,0,0)} + A_{i,j(+1,0,0)} + A_{i,j(0,-1,0)} + \\ A_{i,j(0,+1,0)} + A_{i,j(0,0,-1)} + A_{i,j(0,0,+1)} \end{pmatrix}$$

$$A_{i,j(-1,+1,0)} = -\frac{b_{(-1,0,0)} + b_{(0,+1,0)}}{4}$$

$$A_{i,j(+1,+1,0)} = \frac{b_{(+1,0,0)} + b_{(0,+1,0)}}{4}$$

$$A_{i,j(-1,-1,0)} = \frac{b_{(-1,0,0)} + b_{(0,-1,0)}}{4}$$

$$A_{i,j(+1,-1,0)} = -\frac{b_{(+1,0,0)} + b_{(0,-1,0)}}{4}$$

-continued $$A_{i,j(-1,0,+1)} = -\frac{c_{(-1,0,0)} + c_{(0,0,+1)}}{4}$$

$$A_{i,j(+1,0,+1)} = \frac{c_{(+1,0,0)} + c_{(0,0,+1)}}{4}$$

$$A_{i,j(-1,0,-1)} = \frac{c_{(-1,0,0)} + c_{(0,0,-1)}}{4}$$

$$A_{i,j(+1,0,-1)} = -\frac{c_{(+1,0,0)} + c_{(0,0,-1)}}{4}$$

$$A_{i,j(0,-1,+1)} = -\frac{e_{(0,-1,0)} + e_{(0,0,+1)}}{4}$$

$$A_{i,j(0,+1,+1)} = \frac{e_{(0,+1,0)} + e_{(0,0,+1)}}{4}$$

$$A_{i,j(0,-1,-1)} = \frac{e_{(0,-1,0)} + e_{(0,0,-1)}}{4}$$

$$A_{i,j(0,+1,-1)} = -\frac{e_{(0,+1,0)} + e_{(0,0,-1)}}{4}.$$

In the coefficients, j(x,y,z) refers to the column in the matrix A corresponding to the voxel at the relative position (x,y,z) to the current voxel. The terms $a_{(x,y,z)}$, $b_{(x,y,z)}$, $c_{(x,y,z)}$, $d_{(x,y,z)}$, $e_{(x,y,z)}$, and $f_{(x,y,z)}$ refer to the corresponding element of the diffusion tensor at the relative position (x,y,z). These nonzero coefficients correspond to a surrounding neighborhood or kernel defined by a 3×3×3 cube with the eight corners removed. Once the kernel is constructed, any of several iterative solutions is used to arrive at an approximate solution to equation (10) and obtain final voxel intensity values that correspond to EED image data.

If the scale σ of the derivative calculation is chosen so that there will be strong gradients at edges between the large scale structures and weak gradients in homogeneous areas, EED will isotropically blur the homogeneous areas to remove the smallest structures from the image and enhance the edges between the large scale structures. However, choosing a too large scale for the calculation of the gradients will cause a low response in areas with important intermediate structures and will blur these structures. Choosing too small a scale will enhance noise structures instead of blurring them. It is typically not possible with EED to choose one optimum scale for calculating the derivatives that both smoothes all noise in homogeneous areas and preserves the resolution while increasing the contrast of small structures. Another problem with EED is that it causes an equal amount of diffusion in the two directions perpendicular to the gradient. Therefore, EED is well suited for plate-like edges with low curvature, but it will round the corners in high curvature areas. Also, a typical approach to implementing EED is computationally intensive and is usually not regarded as useful in clinical applications due to lengthy processing times.

A better solution is to create a filtered image that is an adaptively weighted interpolation between the original image and an EED enhanced image. To eliminate the problems with typical EED implementations, the original image would be preserved in areas of high curvature such as vessels and calcifications. The noise in the original image in those areas would not be filtered. Thus, the final filtered image will contain an amount of noise that is between the original image and the EED image. Because a typical implementation of EED is by itself already computationally intensive, an interpolated solution is more feasible if implementing EED can be streamlined.

Figure 4:
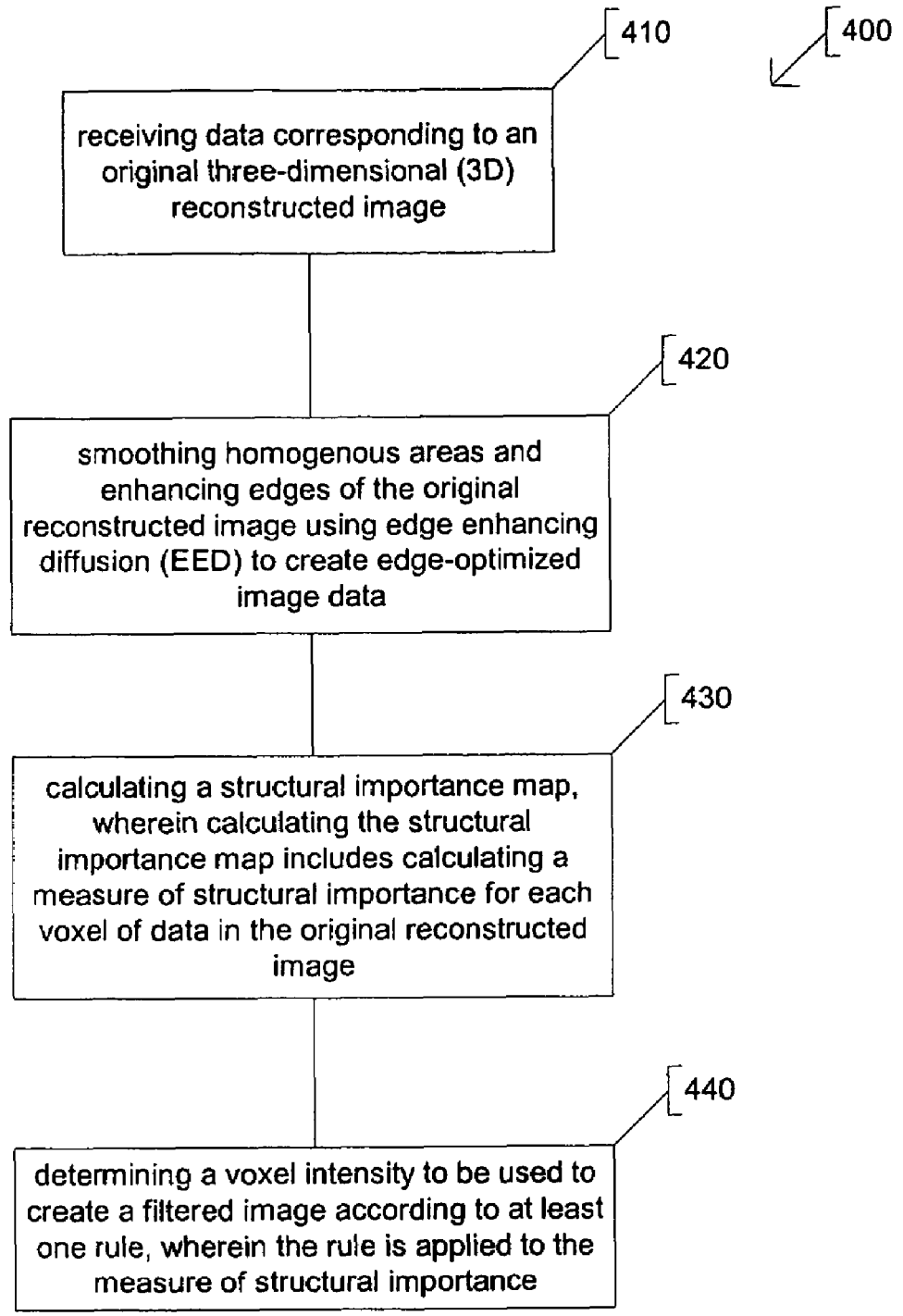
FIG. 4 is a block diagram of a method to filter a 3D reconstructed image.

FIG. 4 is a block diagram of a method 400 to filter a 3D reconstructed image. At 410, data corresponding to a three-dimensional (3D) reconstructed image is received. In some examples, the 3D image is reconstructed from rotational X-ray projection data. In some examples, the 3D image is reconstructed from MRI data. In some examples, the image is reconstructed from 3D ultrasound data.

At 420, homogenous areas are smoothed and edges of the original reconstructed image are enhanced using edge enhancing diffusion (EED) to create edge-enhanced image data. At 430, a structural importance map is calculated. The importance map is used to determine the amount of interpolation between the original reconstructed image and the EED image. The amount of interpolation is based on the importance of the structure, with more importance given to structures such as calcifications and vessels. At 440, voxel intensities that will be used to create a filtered image are determined. These intensities are created according to one or more rules that are applied to a measure of structural importance. In some examples, the rules include a) using original image data at image locations with important structures, b) using EED image data at locations where there are structures having little or no importance, and c) using interpolated image data at locations with structures of intermediate importance.

In calculating the structural importance map, a measure of structural importance is calculated for each voxel of data in the original reconstructed image. The measure of structural importance is created for each voxel at each measurement scale. The number of scales depends on the desired accuracy of the result. Smaller scale steps results in a more accurate solution but adds to the computation time.

In some examples, the measure of structural importance T is based on the total amount of curvature calculated at a voxel for each of the measurement scales. In some examples, the total amount of curvature S is calculated by $$S = \sqrt{\lambda_1^2 + \lambda_2^2 + \lambda_3^2}, \quad (18)$$

where $\lambda_n$ is the nth eigenvalue of the Hessian matrix. The Hessian matrix is a 3×3 matrix of second order derivatives of the image intensity as a function of the three dimensions x, y, and z. The equation for the measure of importance based on S is $$T(S) = 1 - \exp\left(\left(-\frac{S}{\alpha}\right)^{\frac{-1}{\log(-(\beta/\alpha)-1)}}\right). \quad (19)$$

The function T(S) has a range of zero to one, tending to one if there is importance information that should be preserved. The original image voxel data will automatically be used at positions having a high importance measure (and therefore high curvature), EED image voxel data will be used at positions having a low importance measure, and interpolated data will be used at positions having intermediate importance. The largest calculated value of T(S) for each voxel is used when constructing the importance map.

Figure 5:
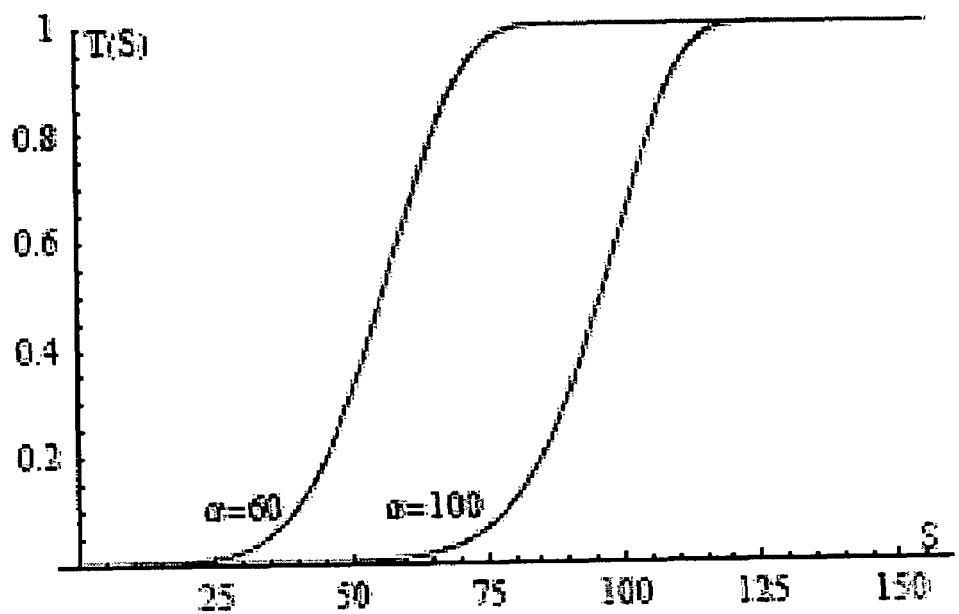
FIGS. 5A-B show graphs of an example of a measure of structural importance.
Figure 5:
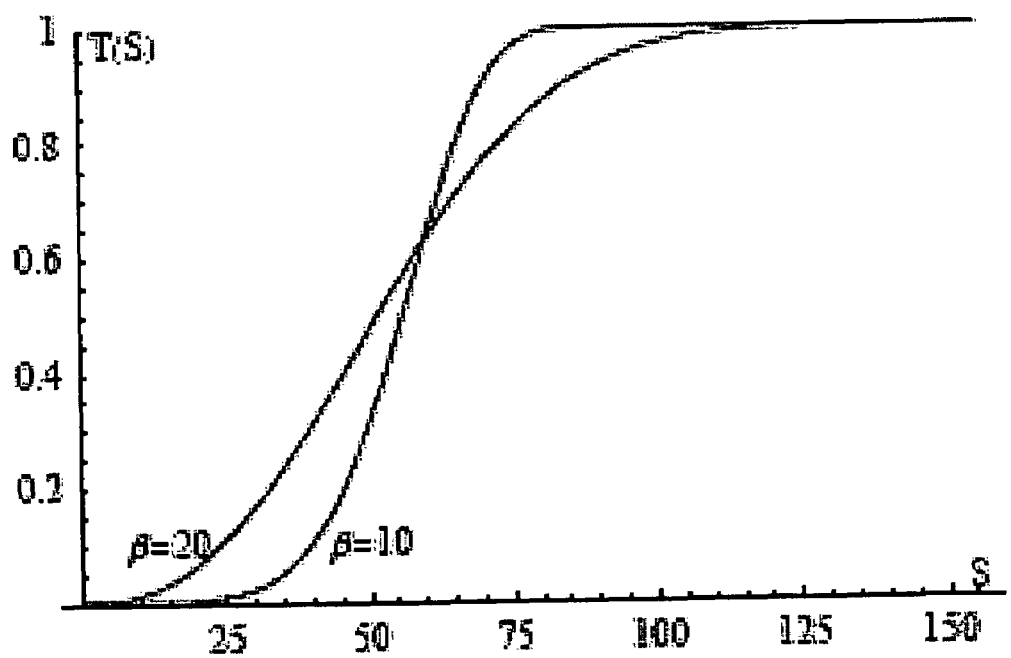

FIGS. 5A and 5B show graphs 500 of the importance measure T(S). FIG. 5A shows that the curvature threshold for which T(S) begins to increase above zero is controlled by α. Typically, threshold values of 55-65 are used. FIG. 5B shows that the steepness with which T(S) increases from zero to one as curvature increases is controlled by β. The graph shows that the lower the value of β, the steeper the slope of the importance measure and the more the importance measure becomes a simple threshold, i.e., the structure is deemed to be important or not important without intermediate measures. Typical values of β range between five and fifteen. Once T(S) is calculated for each voxel, a blurred version of the importance measure T'(S, σ) is calculated for use in finding the final pixel intensities. T'(S, σ) is typically calculated from T(S) by Gaussian blurring. In Gaussian blurring, each importance measure of a voxel is set to a weighted average of the voxel and the voxel's immediate neighbors. The scale of the Gaussian blurring a is small (typically<1.0). The blurring helps obtain a smooth transition between the original image and the EED image.

The final voxel intensities that will be used to create the filtered image are calculated using the EED image, the original image, the unblurred version of the importance measure T(S) and the blurred version of the importance measure T'(S, σ). The equation for the final voxel intensity is $$I_{out} = T'(S,\sigma)I_{in} + (1-T'(S,\sigma))I_{eed}, \quad (20)$$

where $$T'(S,\sigma) = \beta(T(S)*K(\sigma)), \quad (21)$$

and $I_{in}$, $I_{out}$, and $I_{eed}$ are the intensities of the input image, the output image, and the EED image, respectively. The variable σ is the scale of the interpolation factor blurring used in areas with intermediate structural importance. A higher value of σ will reduce small artifacts, while a lower value will preserve smaller details. The variable β is used to control the amount of diffused image intensity used. Typically β is set to one in equation (21).

The filtered image is then ready for display. To eliminate the problems with typical EED implementations, the original image would be preserved in areas of high curvature such as vessels and calcifications. The noise in the original image in those areas would not be filtered. Thus, the final filtered image will contain an amount of noise that is somewhere between the original image and the EED image. The filtered image preserves the original image in areas of high structural importance (high curvature), uses the EED image in areas of low structural importance, and uses an intermediate level of diffusion in areas of intermediate structural importance. In some examples, the method 400 further includes optionally displaying either the original reconstructed image or the filtered image. In some examples, the method 400 further includes optionally displaying one of the original reconstructed image, the filtered image, and the EED image.

In some examples, the method 400 includes creating an image having an amount of noise interpolated between the amount of the noise in the original image and the amount of noise in the filtered image. The interpolated image is optionally displayed. In some examples the interpolation is a linear interpolation. In some examples, a user selects the amount of noise in the interpolated image. In some examples, a user selects an amount of noise using a graphical user's interface (GUI). As an illustrative example, the GUI is a sliding scale manipulated by a user to choose an amount of noise between a minimum (such as the filtered image) and a maximum (such as the original image).

In some examples of the method 400, the edges are enhanced using a fast EED method. The creation of the EED diffusion tensors includes an optimization over typical EED implementations in that the diffusion tensor does not always need to be calculated. If the calculated first eigenvalue of the diffusion tensor is very close to one, all three eigenvalues will be very close to one. Diffusion with the resulting diffusion kernel is comparable to diffusion with the identity matrix. Therefore, the diffusion tensor can be quickly set to the identity matrix if the first eigenvalue is very close to one.

The value for the gradient norm that corresponds to this optimization can be derived from equation (13). The value of the first eigenvalue $\lambda_1$ is set equal to 1 if it will be "very close" to the value of 1. If $\epsilon$ is the desired accuracy in defining what is "very close" to one, this leads to the condition $$1 - \exp\left(\frac{-C_m}{(\|\nabla u_\sigma\|/\lambda)^m}\right) > 1 - \varepsilon, \tag{22}$$

which is true if $$\|\nabla u_\sigma\| < \lambda\left(-\frac{\log[e]}{C_m}\right)^{-1/m}. \tag{23}$$

Thus, if the value of the gradient norm is below the threshold in equation (23), the diffusion tensor is set to the identity matrix. Thus only the gradient and the gradient norm need to be calculated. Using the optimization with an accuracy $\epsilon=0.001$, the average-squared difference between the resulting image intensity and the typical EED method is less than 0.0001.

Once the diffusion tensors are constructed for the voxels, the image is diffused. As discussed previously, diffusing the image is simplified if a kernel filter approach is used.

An iterative solution of the anisotropic diffusion equation (7) using the matrix-multiplication of equation (10) is referred to as an explicit solution. A number of iterations is chosen depending on the desired scale in scale-space and the desired accuracy. Diffusion methods that implement explicit solutions to the diffusion equation have a restriction on the size of $\Delta t$, the step size in scale-space. The maximum $\Delta t$ is typically ⅙. The smaller $\Delta t$, the more accurate the solution will be. Because the anisotropic diffusion algorithm is time consuming, a low number of iterations is chosen, essentially choosing computing time over high accuracy. A value of $\Delta t = 0.15$ is typically used as the explicit $\Delta t$ because of its numerical stability and reasonable accuracy.

Another solution for solving the anisotropic diffusion equation (7) is the semi-implicit equation $$U_{k+1} = U_k + \Delta t A(U_k) U_{k+1}. \tag{24}$$

Because $U_{k+1}$ is the image being calculated, the multiplication $A(U_k) U_{k+1}$ cannot be performed, so equation (24) is rewritten through $$(I - \Delta t A(U_k)) U_{k+1} = U_k, \tag{25}$$

as $$U_{k+1} = (I - \Delta t A(U_k))^{-1}(U_k). \tag{26}$$

Schemes based on a solution to a semi-implicit equation have no such limitation on $\Delta t$ and can make $\Delta t$ equal to t, i.e. these schemes only require one iteration to arrive at a solution. However, a semi-implicit scheme is typically considered to be too expensive in computing time per iteration. This is because of the extremely large system of linear equations that needs to be solved.

The semi-implicit scheme described herein is specifically optimized to solve this large system of linear equations for the anisotropic diffusion problem. This optimized diffusion method provides a fast and perfect solution with accuracy shown to be comparable to explicit scheme scale-space steps with $\Delta t \leq 0.01$. The scheme has been shown to be faster than explicit schemes for $\Delta t$ above approximately 0.15. The semi-implicit scheme will now be described and several optimizations will be introduced.

Equation (26) can be written as $$A'X = B, \tag{27}$$

where $A' = (I - \Delta t A(U_k))$, B equals the discretized voxel values $U_k$, and X equals the solution $U_{k+1}$. The coefficients of A' are $a_{ii}' = 1 - \Delta t A_{ii}$ and $a_{ij}' = \Delta t A_{ij}$. There are several iterative methods available to solve this equation such as the Jacobi method and the Gauss-Seidel method for example.

The Jacobi method iteratively solves the equation for one unknown $x_i$ while assuming all the other $x_i$'s are correct. The equation for the unknowns of X is $$x_i^k = \frac{b_i - \sum_{j \neq i} a_{ij}' x_j^k}{a_{ii}'}, \tag{28}$$

where k is the iteration of the calculation. The method will converge to the solution x after several iterations because the matrix A' has been shown to be diagonal dominant. The convergence time of the Jacobi method can be improved; leading to the first optimization.

As discussed previously, for the 3D anisotropic diffusion equation, there are nineteen nonzero values for $A_{ij}$ and these are listed in equation (17). Thus, there are also nineteen nonzero values for $a_{ij}'$. The first optimization of the semi-implicit scheme follows from the fact that if all nineteen $x_i^k$ terms that correspond to the nineteen nonzero elements of $a_{ij}'$ are equal to $x_j^{k-1}$, i.e., the same value during the last iteration, the value of $x_i$ will not change between subsequent iterations. Therefore, it is not necessary to calculate a new voxel value if the voxel value and the values of its eighteen neighbors did not change in a previous iteration, i.e. the difference between the old and new voxel values is less than a threshold difference value. If a value of a voxel changes, the voxel and its eighteen surrounding voxels are marked for evaluation in the next iteration of the solution. This marking forms an active voxel mask. Only the marked voxels are re-evaluated in the next iteration. Because the matrix A' in Equation (22) is diagonal dominant, this "fast Jacobi" method will converge to a solution and the number of voxels marked in the active voxel mask will decrease over iterations. The processing time in turn will decrease exponentially per iteration.

The convergence speed of the solution to equation (27) is increased by using the calculated values of x directly in the current iteration of the solution, rather than in the next iteration as is done with the ordinary Jacobi method. The Gauss-Seidel method replaces the calculated $x_i$ directly with its new value. This can be viewed as using feedback from previous solution iterations in the current solution iteration. The Gauss-Seidel method uses this feedback principle. The Gauss-Seidel method calculates the solution to X by $$x_i^k = \frac{b_i - \sum_{j<i} a_{ij}' x_j^k - \sum_{j>i} a_{ij}' x_j^{k-1}}{a_{ii}'}. \tag{29}$$

The convergence speed of the Gauss-Seidel method is twice that over the ordinary (versus the fast) Jacobi method. The Gauss-Seidel method has other advantages in addition to the increased convergence speed. Because the method replaces the calculated value of $x_i$ directly with its new value, it is not necessary to store the new values in a temporary image. Because the time to store a temporary image is saved and because of the increased convergence speed, the Gauss-Seidel method decreases the time to calculate a total solution by a factor of two.

The resulting "Fast Gauss-Seidel" method is not strictly the same as the Gauss-Seidel method. Because of the active voxel masking, not all of the elements of $x^k$ are evaluated every iteration. With the Gauss-Seidel method, the new value $x_j^k$ of a voxel $x_j^{k-1}$ influences the calculation of the elements $x_j^{k+1}$, where $j>i$ and $A_{ij} \neq 0$. With the Jacobi method, the new value of $x_j^k$ only influences the calculation of the values of $x^{k+1}$. It is possible with the extended method that $x_i$ is active and that one or more elements $x_j$ are inactive. If all the $x_j$ elements are inactive, the extended method resembles the Jacobi method locally. If both $x_i$ and all the $x_j$ elements are active, the extended method resembles the Gauss-Seidel method locally. Therefore, the Fast Gauss-Seidel method is, convergence-wise, a hybrid of the Jacobi method and the Gauss-Seidel method.

An extension to the Gauss-Seidel method is the Successive Over-Relaxation (SOR) method. SOR extrapolates the values of the current iteration $x^k$ calculated with the Gauss-Seidel method. The extrapolation can be viewed as a weighted average between the previous iteration and the current iteration solution value calculated with the Gauss-Seidel method discussed previously, i.e.

$$x_i^k = \omega \overline{x_i^k} + (1-\omega) x_i^k, \qquad (30)$$

where $\overline{x_i^k}$ is the value calculated by the Gauss-Seidel method and $\omega$ is the extrapolation factor. The parameter $\omega$ is chosen to be between 0 and 2. The method converges quicker than the Gauss-Seidel method if the optimal value of $\omega$ is chosen.

An optimization to the semi-implicit scheme is to use the SOR extension with the Fast Gauss-Seidel method. This means that $\overline{x_i^k}$ in equation (30 will be the value calculated with the Fast Gauss-Seidel method.

Another optimization of the semi-implicit scheme simplifies the kernel coefficients where the diffusion tensor is set to the identity matrix. If the diffusion tensors of the input voxel and the diffusion tensors of its six neighboring voxels are equal to the identity matrix then the coefficients in Equation (17) simplify to $A_{i,j(+1,0,0)} = 1$ $A_{i,j(-1,0,0)} = 1$ $A_{i,j(0,+1,0)} = 1$ $A_{i,j(0,-1,0)} = 1$ $A_{i,j(0,0,+1)} = 1$ $A_{i,j(0,0,-1)} = 1$ $$A_{i,j} = -3. \qquad (29)$$

With these coefficients, it is not necessary to access the values of the diffusion tensors to perform the calculation in equation (28). The calculation simplifies to a weighted average of the value of the input voxel and the values of its six neighbors. To facilitate this optimization, each identity diffusion tensor is marked during construction of the diffusion tensors to form a mask. This identity mask is then eroded with a seven point kernel that includes the input voxel and its six surrounding neighbors. This means that if all seven diffusion tensors corresponding to the locations defined by the seven point kernel are equal to the identity matrix, the calculation of $x_i^k$ during the iterative methods or explicit scheme switches to the simple weighted average for the voxel instead of the normal, complicated solution of the discretization of the diffusion equation.

The optimizations used to calculate the diffusion tensors and the optimizations to diffuse the image make EED less computationally intensive and greatly decrease the processing time required to create an EED image. In some examples of the fast EED method, the method is deemed to arrive at a solution when a number of voxels that change is less than or equal to a specified threshold number of voxels. In some examples, the threshold number of image voxels is zero, meaning that no voxels change their value during an iteration of the solution. The final voxel intensities define a solution to the diffusion equation and define EED image data.

The optimizations of the fast EED method are independent of each other. This means various examples of the method include any one of the optimizations or any combination involving one or more of the optimizations.

Figure 6:
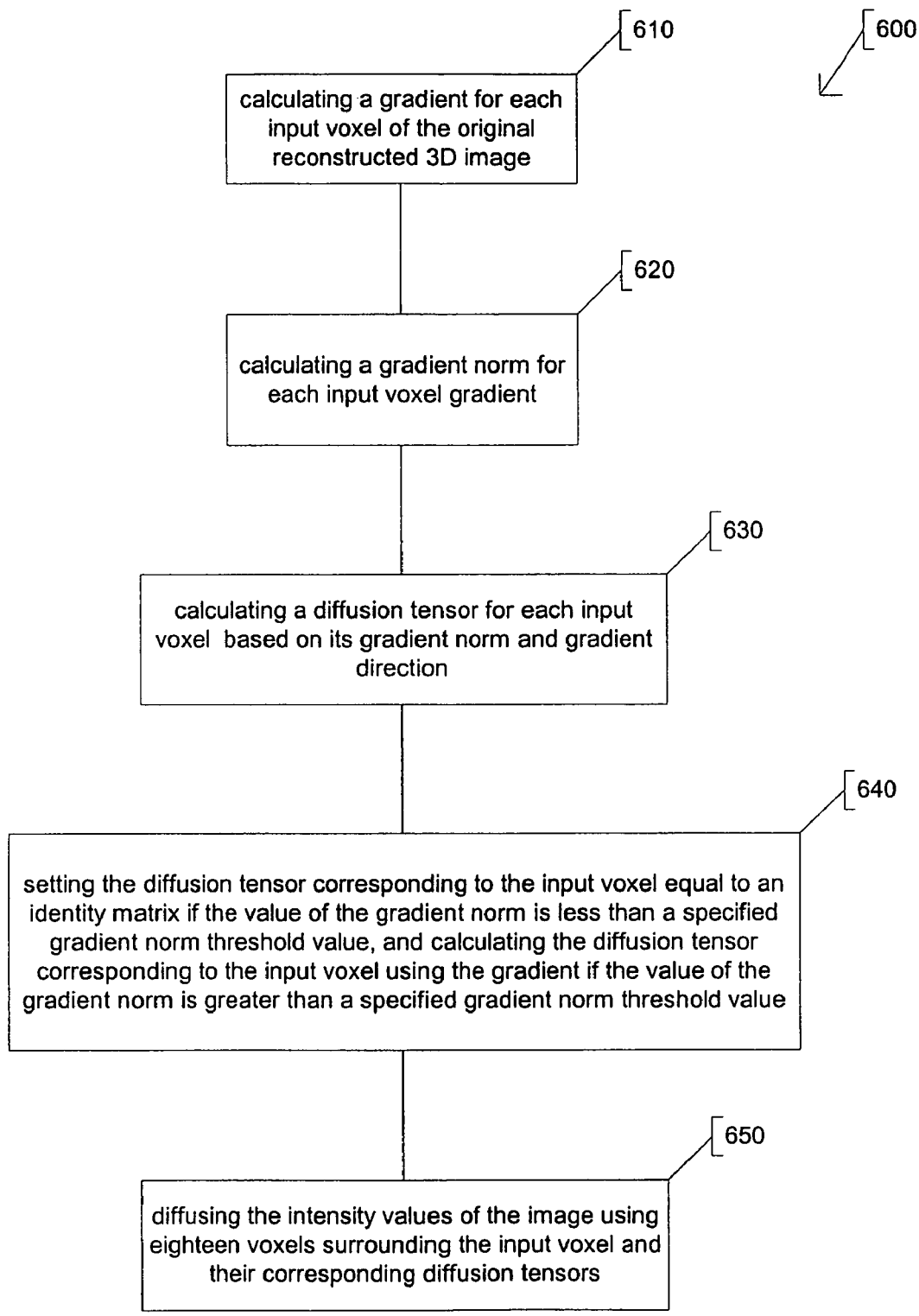
FIG. 6 is a block diagram of an example of a method of implementing edge enhanced diffusion (EED).

FIG. 6 is a block diagram of an example of a method 600 of implementing EED to create edge-enhanced image data from reconstructed 3D image data. The method smoothes homogenous areas and enhances edges of the original reconstructed image to create edge-optimized data. At 610, a gradient is calculated for each input voxel of the original reconstructed 3D image. At 620, a gradient norm is calculated for each input voxel gradient. At 630, a diffusion tensor for each input voxel is calculated based on its gradient norm and gradient direction.

In some examples, the method 600 includes at 640, setting the diffusion tensor corresponding to the input voxel equal to an identity matrix if the value of the gradient norm is less than a specified gradient norm threshold value and calculating the diffusion tensor corresponding to the input voxel using the gradient if the value of the gradient norm is greater than a specified gradient norm threshold value. In some examples, the specified gradient norm threshold value is the threshold in equation (23). An identity mask is created for image data that indicates which voxels, if any, have a corresponding diffusion tensor equal to an identity matrix.

At 650, the intensity values of the image are diffused using eighteen voxels surrounding the input voxel and their corresponding diffusion tensors. In some examples, the intensity values of the image are diffused using an explicit anisotropic diffusion discretization, such as by solving equation (10). In some examples, the intensity values of the image are diffused using semi-implicit anisotropic diffusion discretization, such as by solving equation (26). In some examples, semi-implicit anisotropic diffusion discretization includes an iterative solution method to calculate a diffused intensity value for the voxels. Examples of iterative solutions include the Jacobi method, the Gauss-Seidel method, the fast Jacobi method, the Fast Gauss-Seidel method, and any of the four methods combined with the SOR extension.

In some examples, the identity mask is eroded with a kernel having seven points corresponding to a center point and the center point's six neighbors to identify those voxels, if any, where that voxel and all the surrounding six voxels have corresponding diffusion tensors equal to the identity matrix. If the input voxel is included in the identity mask after the erosion, the diffused intensity value of an input voxel is calculated using a weighted average of the intensity value of the input voxel and the intensity values of its six neighboring voxels. If the input voxel is not in the eroded identity mask during the first iteration, the normal, a more complicated diffusion kernel solution of the discretization of the diffusion equation is used.

After the first iteration of the iterative solution method, any voxels that change intensity value and their eighteen surrounding voxels are marked for evaluation in a subsequent iteration. In some examples, marking the voxels includes creating an active voxel mask that identifies the voxels that change value after the first iteration. Final diffused voxel intensity values are determined by performing subsequent iterations of the iterative solution method and marking any voxels that change intensity value after each subsequent iteration until either no voxels change intensity value or a number of voxels change that is less than a specified threshold number.

Although this method of marking the voxel and the eighteen surrounding voxels is fast, it can still be improved upon. This is because a considerable amount of computation time would be spent marking active voxels. If a voxel changes value, that voxel and its eighteen surrounding voxels need to be marked for evaluation in the next iteration. This can be done at the same time (when the voxel has changed its value) or it can be done for all the voxels at the same time after a full iteration is completed. In extreme cases, this can result in a voxel being marked for evaluation eighteen times if all of its surrounding neighbors change. Thus, in some examples of the method 600, if an active voxel mask is used, only the voxels that change during the iteration are marked for evaluation. The active voxel mask is then dilated with a kernel to identify the active voxels and the surrounding eighteen voxels. Thus voxels are marked for evaluation using a coarse granularity that reduces repeated marking that would otherwise occur using a finer level of marking. In some examples, the kernel contains nineteen points defined by a 3×3×3 voxel cube centered on the input voxel with the eight corners removed. Just as in the marking method, this results in the same decrease in the number of voxels marked in the active voxel mask over subsequent iterations but further decreases the processing time per iteration.

Dilation with a 3×3×3 cube can be done with three separate dilations of a three point kernel to essentially perform a twenty-seven point dilation. A two dimensional (2D) example of two separate dilations with a three point kernel is illustrated in FIGS. 7A-C. FIG. 7A represents a mask of changing voxels marked in a 5×5 input image. FIG. 7B shows an interim output mask created by dilation in the x direction with a 3 point kernel. For all pixels in the input image, the current pixel is marked in an interim output mask if the current pixel is marked or its left or right neighbor is marked. FIG. 7C shows an output mask created by dilating the interim mask in the y direction with a 3 point kernel. For all pixels in the interim mask, the current pixel is marked in the output mask if the current pixel is marked or its top or bottom neighbor is marked. To extend the example to three dimensions, for all pixels in the output mask of FIG. 7C, the current pixel is marked in a final output mask if the current pixel is marked or its back or front neighbor is marked.

Figure 8:
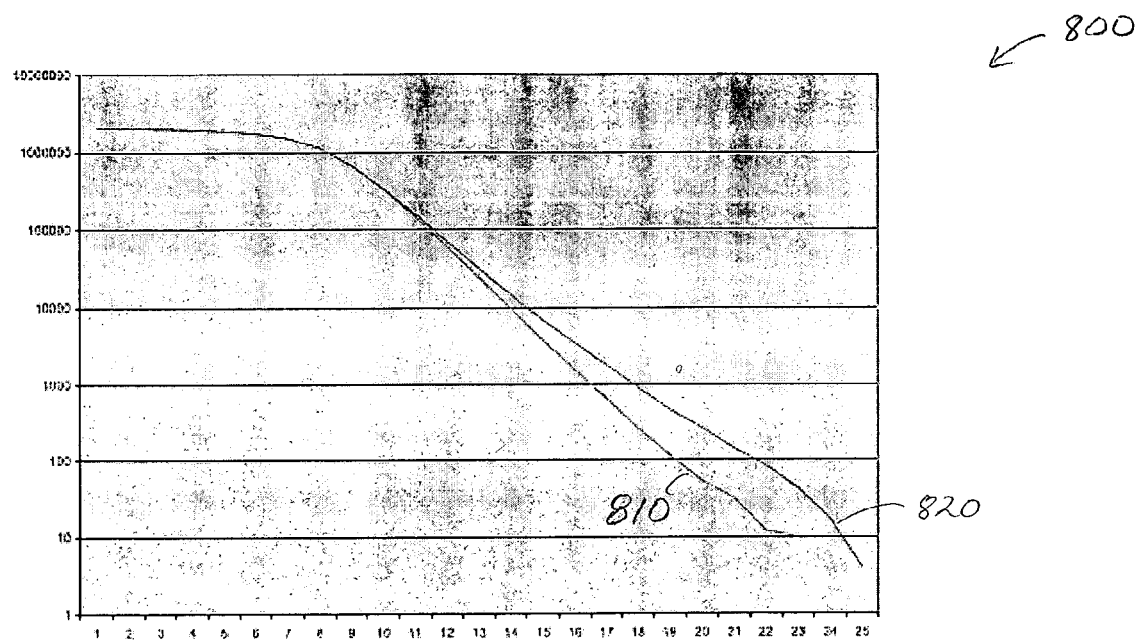
FIG. 8 shows examples of graphs of the number of voxels that change per iteration of a solution to the diffusion equation.

FIG. 8 shows examples of graphs 800 of the number of voxels that change per iteration when using the optimized method of solving the semi-implicit anisotropic diffusion equation. The optimized method uses the Fast Gauss-Seidel method with the SOR extension. The graphs 800 illustrate the computational complexity for finding a solution for a 128×128×128 image. The log of the number of voxels that change are graphed as a function of the iteration number. Graph 810 shows the number of voxels that change using a nineteen points kernel and graph 820 shows the number of voxels that change using a twenty-seven points kernel, where the twenty-seven points kernel is actually three separate dilations of a three points kernel. Although a twenty-seven points dilation results in more iterations to arrive at a solution, the overall processing time is improved because dilations with a three points kernel can be highly optimized. This is because only 3×3, or nine, bits only need to be accessed in each separate dilation. Because of several optimizations that use the binary structure and possible sparseness of bits in the active voxel mask, the computation time spent on the additional iterations of the separable twenty-seven points dilation over the active voxels is negligible in comparison with the actual diffusion of the active voxel. Less than 1% of the total computation time is spent on these active voxel mask operations. The EED images generated with the three methods (nineteen points kernel, twenty-seven points kernel, and separable twenty-seven points kernel) are indistinguishable.

Figure 9:
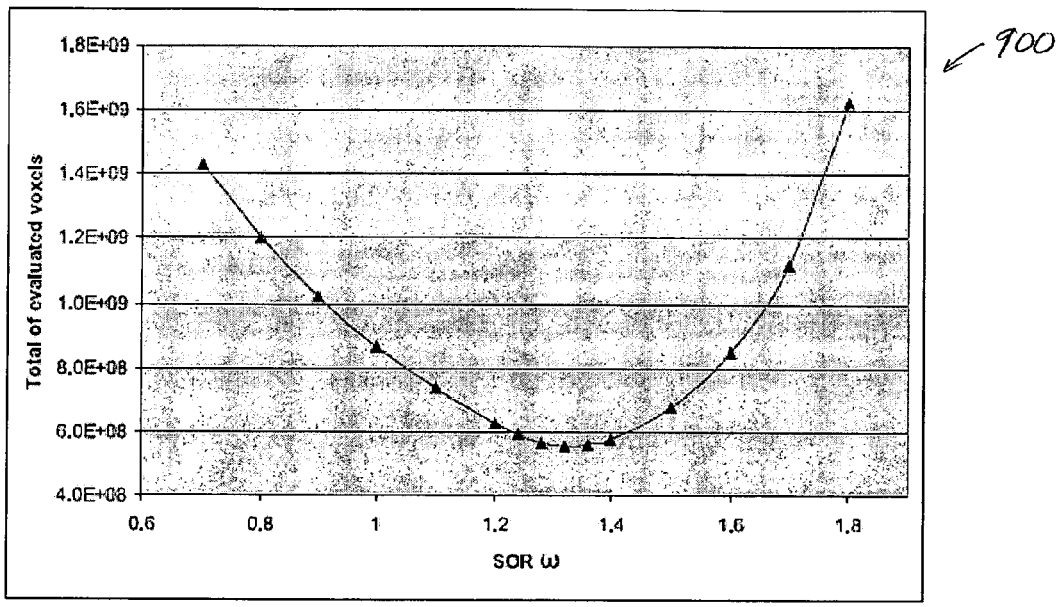
FIG. 9 shows a graph of the change in the total number of evaluated voxels for different values of an extrapolation parameter.
Figure 10:
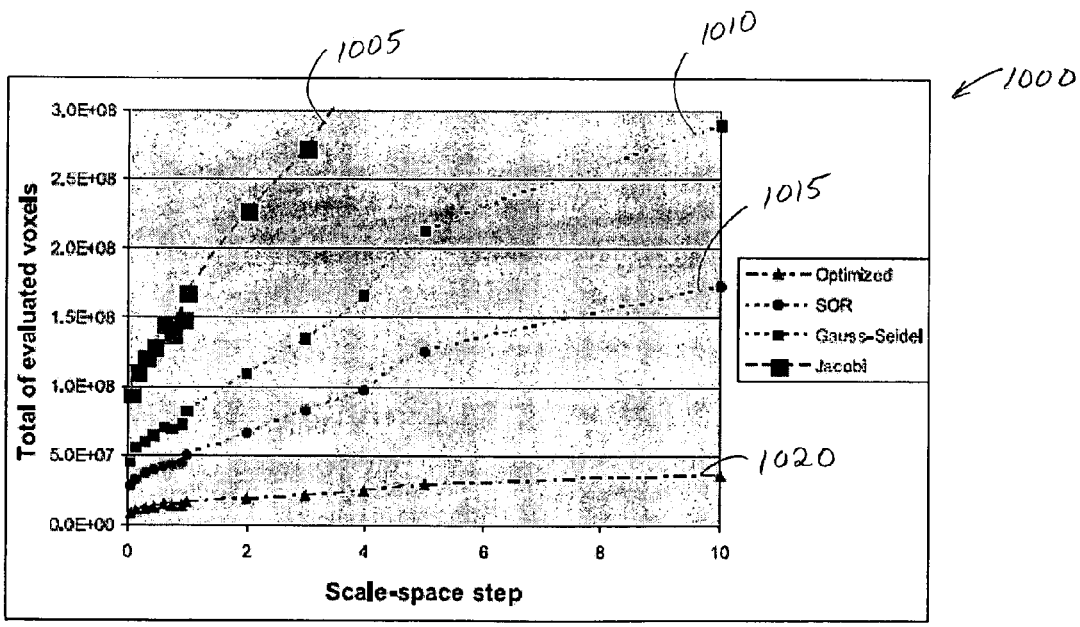
FIG. 10 shows graphs of the total number of voxels evaluated in arriving at an iterative solution to the semi-implicit EED equation.

FIG. 9 shows a graph 900 of the change in the total number of evaluated voxels for different values of the extrapolation parameter ω in the SOR method. Different values of ω were used on thirty-two different 140×140×140 CT images. FIG. 10 shows graphs 1000 of the total number of voxels evaluated in arriving at an iterative solution to the semi-implicit EED equation as a function of different scales. Graph 1005 corresponds to a solution using the ordinary Jacobi method. Graph 1010 corresponds to a solution using the Gauss-Seidel method. Graph 1015 corresponds to a solution using the SOR method. Graph 1020 corresponds to a solution using the SOR method in combination with the active voxel mask. The graphs show the average of thirty-two different 140×140×140 CT images. The SOR extrapolation parameter ω was set to 1.33. The graphs show that the computational complexity varies approximately linearly with the step size in scale space Δt and that the optimized method of solving the semi-implicit anisotropic diffusion equation is approximately 5 times as efficient as the SOR method. The filtered images from the four methods were indistinguishable.

Figure 11:
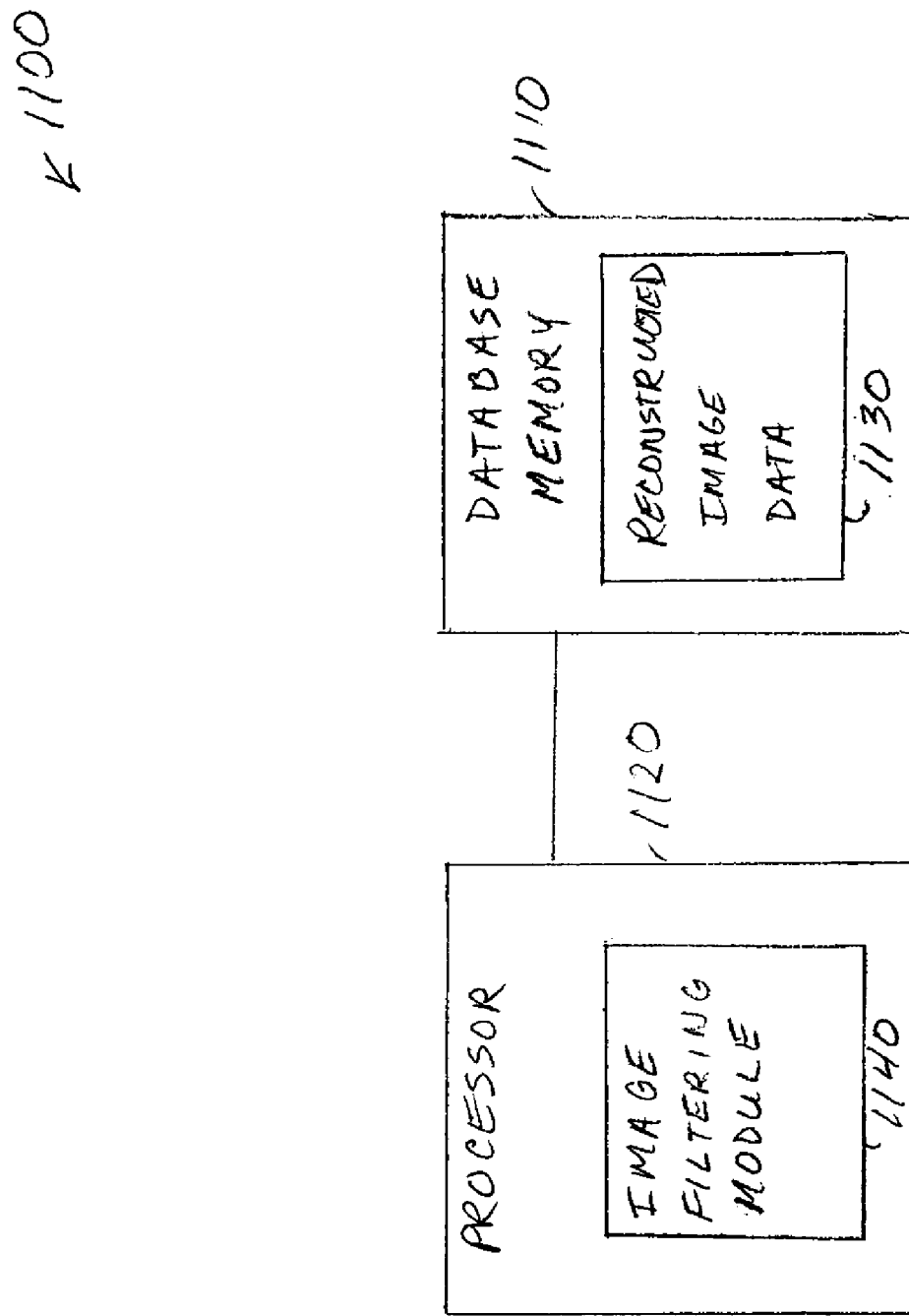
FIG. 11 shows an example of a system to filter noise from a 3D reconstructed image.

FIG. 11 shows an example of a system 1100 that includes a database memory 1110 and a processor 1120 in communication with the database memory 1110. In some examples, the processor 1120 is in communication with the database memory 1110 via a system bus. In some examples, the processor 1120 is in communication with the database memory 1110 via a system network. In some examples, the system 1100 includes a server in communication with the processor 1120 over the network and the database memory 1110 is included in a memory included in the server. In some examples, the processor 1120 and the database memory 1110 are included in the same computer. In some examples, the processor 1120 is one of a plurality of processors in the computer and is dedicated to image processing.

The database memory 1110 stores original reconstructed image data 1130 corresponding to an original three-dimensional image data. In some examples, the 3D image is reconstructed from rotational X-ray projection data. In some examples, the 3D image is reconstructed from MRI data. In some examples, the 3D image is reconstructed from ultrasound data. The processor includes an image filtering module 1140. The image filtering module 1140 is operable to smooth homogenous areas and enhance edges of the original reconstructed image using edge enhancing diffusion (EED) to create edge-enhanced image data. The image filtering module 1140 typically is operable by executing an algorithm or algorithms implemented by hardware, software, firmware or any combination of hardware, software or firmware. In some examples, the image filtering module 1140 includes a fast EED algorithm to create edge-enhanced image data. The examples of an image filtering module 1140 include a module with any of the fast EED algorithms or combinations of the algorithms described previously. The image filtering module 1140 also calculates a structural importance map that includes a measure of structural importance for each voxel of data in the original reconstructed image. Examples of image filtering module 1140 execute algorithms to implement any of the several methods to calculate a structural importance map described previously.

The image filtering module 1140 further determines a voxel intensity to be used to create a filtered image according to a rule or rules applied to the measure of structural importance. In some examples, the image filtering module 1140 uses multiple rules to determine a voxel intensity to be used in a filtered version of the reconstructed image. These rules include a) using voxel intensity data from the original reconstructed image when a voxel has a high measure of structural importance, b) using diffused voxel intensity data from the edge-enhanced image data when a voxel has a low measure of structural importance, and c) using a value of voxel intensity interpolated between the voxel intensity data in the original reconstructed image and the voxel intensity of the edge-enhanced image data when a voxel has an intermediate measure of structural importance.

In some examples, the system 1100 includes a display coupled to the processor 1110. The processor 1110 displays a filtered image using the voxel intensities calculated from the rules. In some examples, the processor 1120 displays the original unfiltered reconstructed image from the original reconstructed image data stored in the database memory. As described previously, the processor 1110 also creates edge-enhanced image data using EED. In some examples, this data is stored in the database memory 1110 and the processor 1110 displays an edge-enhanced image.

In some examples, the system 1100 includes a user interface coupled to the processor 1110. The user interface allows a user to select between displaying the original reconstructed image and the filtered image. In some examples, the user interface further allows displaying an edge-enhanced image created with EED. In some examples, the user interface includes a GUI. In some examples, the image filtering module 1140 is operable to create an interpolated image having an amount of noise interpolated between the amount in the original reconstructed image and the amount in the filtered image, and the GUI allows a user to select an amount of noise to display in the interpolated image. In some examples, the GUI allows a user to linearly vary an amount of noise to display in the filtered image between the amount in the original image and the amount in the filtered image.

The systems and methods described above improve diagnostic capability by reducing noise in 3D reconstructed images, such as those images obtained by CT. Reducing noise in the images makes important structures (e.g. the aorta, heart muscle, small vessels, and calcifications) and their surroundings more conspicuous. The optimizations described above allow computationally complex filtering methods to be brought to a clinical setting.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. A method comprising:

receiving data corresponding to an original three-dimensional (3D) reconstructed image into a computing device;

smoothing substantially homogenous areas and enhancing edges of the original reconstructed image using edge enhancing diffusion (EED) to create edge-enhanced image data;

calculating a structural importance map, wherein calculating the structural importance map includes calculating a measure of structural importance for voxels of data in the original reconstructed image, wherein the measure of structural importance is a function of curvature calculated at a voxel;

calculating a blurred version of the measure of structural importance for the voxels; and determining a voxel intensity to be used to create a filtered image, wherein the voxel intensity is interpolated, between an intensity of the voxel in the EED image and the intensity of the voxel in the original image, using the measure of structural importance and the blurred measure of structural importance.

2. The method of claim 1, wherein the rule includes:

using voxel intensity data from the original reconstructed image when a voxel has a high measure of structural importance;

using diffused voxel intensity data from the edge-enhanced image data when a voxel has a low measure of structural importance; and using a value of voxel intensity interpolated between the voxel intensity data in the original reconstructed image and the edge-enhanced data when a voxel has an intermediate measure of structural importance.

3. The method of claim 1, wherein calculating a structural importance map includes:

calculating a measure of total curvature for a voxel of the original reconstructed image at each of multiple measurement scales;

calculating for each dimension scale a measure of structural importance for the voxel using the measure of total curvature;

using the largest measure of structural importance for the voxel in the structural importance map; and blurring the structural importance map.

4. The method of claim 3, wherein calculating the measure of total curvature of a voxel on a specific scale of measurement includes:

calculating a Hessian matrix for the voxel; and calculating the measure of total curvature using eigenvalues of the Hessian matrix.

5. The method of claim 1, wherein using EED to create edge-enhanced image data includes:

calculating a gradient for each input voxel of the original reconstructed image;

calculating a norm for each input voxel gradient;

calculating a diffusion tensor for each input voxel based on its gradient norm and gradient direction; and diffusing intensity values of an image using eighteen voxels, surrounding an input voxel, and their corresponding diffusion tensors.

6. The method of claim 5, wherein calculating a diffusion tensor for an input voxel includes:

setting a diffusion tensor corresponding to the input voxel equal to an identity matrix if a value of the gradient norm is less than a specified gradient norm threshold value;

creating an identity mask, wherein the identity mask indicates which input voxels, if any, have a corresponding diffusion tensor equal to an identity matrix; and calculating a diffusion tensor corresponding to the input voxel using the gradient if the value of the gradient norm is greater than a specified gradient norm threshold value.

7. The method of claim 6, wherein diffusing the intensity value of the image includes diffusing the image using semi-implicit anisotropic diffusion discretization which in turn includes:

performing a first iteration of an iterative solution method to a semi-implicit anisotropic diffusion equation, including:

calculating a diffused intensity value of an input voxel using a weighted average of the intensity value of the input voxel and the intensity values of its six neighboring voxels if the input voxel is included in the identity mask; and calculating a diffused intensity value of an input voxel using a diffusion kernel that contains a discretization of the anisotropic diffusion equation if the input voxel is outside of the identity mask;

marking any voxels that change intensity value after the first iteration for evaluation in a subsequent iteration; and determining final diffused voxel intensity values by performing subsequent iterations of the iterative solution method and marking any voxels that change intensity value after each subsequent iteration until no voxels change intensity value.

8. The method of claim 7, wherein the iterative solution method includes a Fast Gauss-Seidel method with a Successive Over-Relaxation (SOR) extension.

9. The method of claim 7, wherein creating an identity mask for the diffused image further includes eroding the identity mask with a kernel having seven points corresponding to a center point and the center point's six neighbors to identify those voxels, if any, wherein that voxel and all of its surrounding six voxels have corresponding diffusion tensors equal to the identity matrix.

10. The method of claim 7, wherein marking any voxels that change intensity value after the first iteration includes creating an active voxel mask that identifies the voxels that change intensity value, and wherein the method further includes dilating the active voxel mask using a kernel after each iteration of the iterative solution method.

11. The method of claim 10, wherein dilating the active voxel mask using a kernel includes using a kernel containing nineteen (19) points, wherein the 19 points are defined by a 3×3×3 voxel cube centered on the input voxel with eight (8) corners removed.

12. The method of claim 10, wherein dilating the active voxel mask using a kernel includes using a kernel containing twenty-seven (27) points, wherein the 27 points are defined by a 3×3×3 voxel cube centered on the input voxel.

13. The method of claim 1, further including optionally displaying either the original reconstructed image or the filtered version of the reconstructed image.

14. The method of claim 1, further including:

creating an interpolated image, wherein the interpolated image has an amount of noise interpolated between the amount in the original reconstructed image and the amount in the filtered image; and displaying the interpolated image.

15. The method of claim 14, wherein creating an interpolated image includes creating an interpolated image having an amount of noise in the interpolated image selectable by a user.

16. The method of claim 15, wherein creating an interpolated image includes creating an interpolated image having an amount of noise in the interpolated image selectable by a user using a graphical user's interface (GUI).

17. The method of claim 14, wherein creating an interpolated image includes creating a linearly interpolated image.

18. A non-transitory computer readable medium encoded with computer performable instructions to perform the method comprising: receiving data corresponding to an original reconstructed image, wherein the image is a three-dimensional image reconstructed from rotational X-ray projection data; smoothing substantially homogenous areas and enhancing edges of the original reconstructed image using edge enhancing diffusion (EED) to create edge-enhanced image data; calculating a structural importance map, wherein calculating the structural importance map includes calculating a measure of structural importance for voxels of data in the original reconstructed image, and wherein the measure of structural importance is a function of curvature calculated at a voxel; calculating a blurred version of the measure of structural importance for the voxels; and determining a voxel intensity to be used to create a filtered image, wherein the voxel intensity is interpolated, between an intensity of the voxel in the FED image and the intensity of the voxel in the original image, using the measure of structural importance and the blurred measure of structural importance.

19. A system comprising:

a database memory, the database memory to store original reconstructed image data corresponding to an original three-dimensional reconstructed image; and a processor in communication with the database memory, wherein the processor includes an image filtering module operable to:

smooth homogenous areas and enhance edges of the original reconstructed image using edge enhancing diffusion (EED) to create edge-enhanced image data;

calculate a structural importance map, wherein calculating the structural importance map includes calculating a measure of structural importance for voxels of data in the original reconstructed image, and wherein the measure of structural importance is calculated as a function of curvature determined at a voxel;

calculate a blurred version of the measure of structural importance for the voxels; and determine a voxel intensity to be used to create a filtered image, wherein the voxel intensity is interpolated, between an intensity of the voxel in the EED image and the intensity of the voxel in the original image, using the measure of structural importance and the blurred measure of structural importance.

20. The system of claim 19, further including a display coupled to the processor and a user interface coupled to the processor, the user interface operable to allow a user to select between displaying the original three-dimensional reconstructed image and the filtered image.

21. The system of claim 20, wherein the user interface includes a graphical user interface (GUI), wherein the image filtering module is operable to create an interpolated image having an amount of noise interpolated between the amount in the original reconstructed image and the amount in the filtered image, and wherein the GUI is operable to allow a user to select an amount of noise to display in the interpolated image.

22. The system of claim 21, wherein the image filtering module is operable to create an interpolated image having an amount of noise linearly interpolated between the amount in the original reconstructed image and the amount in the filtered image, and wherein the GUI is operable to allow a user to linearly vary an amount of noise to display in the interpolated image.

23. The system of claim 19 further including a server in communication with the processor over a network, wherein the server includes a server memory, and wherein the server memory includes the database memory.

24. The system of claim 19, wherein the processor and the database memory are included in a computer.

25. The system of claim 19, wherein the image filtering module is further operable to use a plurality of rules to determine a voxel intensity to be used in a filtered version of the reconstructed image, wherein the rules include:
using voxel intensity data from the original reconstructed image when a voxel has a high measure of structural importance;
using diffused voxel intensity data from the edge-enhanced data when a voxel has a low measure of structural importance; and
using a value of voxel intensity interpolated between the voxel intensity data in the original reconstructed image and the diffused voxel intensity data when a voxel has an intermediate measure of structural importance.

26. The system of claim 19, wherein the image filtering module is operable to calculate a structural importance map by a method including:
calculating a measure of total curvature for a voxel of the original reconstructed image at each of multiple dimension scales;
calculating for each dimension scale a measure of structural importance for the voxel using the measure of total curvature;
using the largest measure of structural importance for the voxel in the structural importance map; and
blurring the structural importance map.

27. The system of claim 19, wherein the image filtering module includes a fast EED algorithm to create edge-enhanced image data, the fast EED algorithm including:
calculating a gradient for each input voxel of the original reconstructed image;
calculating a norm for each input voxel gradient;
calculating a diffusion tensor for each input voxel based on its gradient norm and gradient direction, wherein calculating the diffusion tensor includes:
setting the diffusion tensor corresponding to the input voxel equal to an identity matrix if the value of the gradient norm is less than a specified gradient norm threshold value; and
calculating the diffusion tensor corresponding to the input voxel using the gradient if the value of the gradient norm is greater than a specified gradient norm threshold value; and
diffusing intensity values of the image using eighteen voxels surrounding the input voxel and their corresponding diffusion tensors.

28. The system of claim 27, wherein the fast EED algorithm calculates a diffusion tensor corresponding to the input voxel by a method that includes creating an identity mask, wherein the identity mask indicates which input voxels, if any, have a corresponding diffusion tensor equal to an identity matrix.

29. The system of claim 28, wherein the fast EED algorithm creates an identity mask for the diffused image by a method that includes eroding the mask with a kernel having seven points corresponding to a center point and the center point's six neighbors to create an identity mask, the identity mask indicating each voxel, if any, wherein the voxel and all of its surrounding six voxels have corresponding diffusion tensors equal to the identity matrix.

30. The system of claim 29, wherein the fast EED algorithm diffuses the intensity value of the image using semi-implicit anisotropic diffusion discretization, which includes:
performing a first iteration of an iterative solution method to a semi-implicit anisotropic diffusion equation, including:
calculating a diffused intensity value of an input voxel using a weighted average of the intensity value of the input voxel and the intensity values of its six neighboring voxels if the input voxel is included in the identity mask; and
calculating a diffused intensity value of an input voxel using a diffusion kernel that contains a discretization of the anisotropic diffusion equation if the input voxel is outside the identity mask;
marking any voxels that change intensity value after the first iteration for evaluation in a subsequent iteration; and
determining final diffused voxel intensity values by performing subsequent iterations of the iterative solution method, or the weighted average if the input voxel is within the identity mask, and marking any voxels that change intensity value after each subsequent iteration until no voxels change intensity value.

31. The method of claim 30, wherein the iterative solution method is a Fast Gauss-Seidel method with a Successive Over-Relaxation (SOR) extension.

32. The system of claim 30, wherein marking any voxels that change intensity value after the first iteration includes creating an active voxel mask that identifies the voxels that change intensity value, and wherein the method further includes dilating the active voxel mask using a kernel after each iteration of the iterative solution method.

* * * * *

UNITED STATES PATENT AND TRADEMARK OFFICE
CERTIFICATE OF CORRECTION

PATENT NO. : 7,660,481 B2 Page 1 of 1
APPLICATION NO. : 11/281257
DATED : February 9, 2010
INVENTOR(S) : Michiel Schaap et al.

It is certified that error appears in the above-identified patent and that said Letters Patent is hereby corrected as shown below:

In column 20, line 49, in Claim 18, delete "FED" and insert -- EED --, therefor.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,660,481 B2
APPLICATION NO. : 11/281257
DATED : February 9, 2010
INVENTOR(S) : Schaap et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Twenty-eighth Day of December, 2010

David J. Kappos
*Director of the United States Patent and Trademark Office*